(12) United States Patent
Hobbs et al.

(10) Patent No.: US 8,442,311 B1
(45) Date of Patent: May 14, 2013

(54) APPARATUS AND METHOD FOR ENCODING AN IMAGE GENERATED IN PART BY GRAPHICAL COMMANDS

(75) Inventors: David Victor Hobbs, Surrey (CA); Ian Cameron Main, Vancouver (CA); Kimberly Marie Tucker, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 196 days.

(21) Appl. No.: 12/825,092

(22) Filed: Jun. 28, 2010

Related U.S. Application Data

(63) Continuation-in-part of application No. 11/173,303, filed on Jun. 30, 2005, now Pat. No. 7,782,339, and a continuation-in-part of application No. 11/333,955, filed on Jan. 17, 2006, now Pat. No. 7,747,086.

(51) Int. Cl.
*G06K 9/00* (2006.01)
*G06K 9/36* (2006.01)

(52) U.S. Cl.
USPC .......................................................... 382/166

(58) Field of Classification Search ........................ None
See application file for complete search history.

(56) References Cited

U.S. PATENT DOCUMENTS

| | | | |
|---|---|---|---|
| 5,778,092 A * | 7/1998 | MacLeod et al. ............. | 382/176 |
| 5,883,670 A | 3/1999 | Sporer et al. | |
| 6,205,479 B1 | 3/2001 | Dulai et al. | |
| 6,470,436 B1 | 10/2002 | Croft et al. | |
| 6,583,887 B1 | 6/2003 | Clouthier et al. | |
| 6,708,247 B1 | 3/2004 | Barret et al. | |
| 7,120,297 B2 * | 10/2006 | Simard et al. ................. | 382/166 |
| 7,202,872 B2 * | 4/2007 | Paltashev et al. ............. | 345/555 |
| 2004/0017939 A1 | 1/2004 | Mehrotra | |
| 2004/0042687 A1 * | 3/2004 | Curry et al. ................... | 382/302 |
| 2004/0264793 A1 * | 12/2004 | Okubo .......................... | 382/243 |
| 2005/0240685 A1 | 10/2005 | Keys | |
| 2006/0069458 A1 | 3/2006 | Lee et al. | |

OTHER PUBLICATIONS

Of Said, Amir, "Compression of Compound Images and Video for Enabling Rich Media in Embedded Systems", Imaging Systems Laboratory, HP Laboratories Palo Alto, HPL-2004-89, 14 pages, May 11, 2004.*
V. Wu, et al "Finding Text in Images", Proceedings of Second ACM International Conference on Digital Libraries, Philadelphia, PA, pp. 3-12, 1997.*
Non-Final Office Action dated May 12, 2010 for U.S. Appl. No. 11/613,981 entitled "Methods and Apparatus for Communications Between a Virtualized Host and Remote Devices", 27 pages.
"USB/IP—a Peripheral Bus Extension for Device Sharing over IP Network", Takahiro Hirofuchi, Eiji Kawai, Kazutoshi Fujikawa, and Hideki Sunahara, Nara Institute of Science and Technology, Ikoma, Japan, FREENIX Track: 2005 USENIX Annual Technical Conference.

* cited by examiner

*Primary Examiner* — Samir Ahmed
(74) *Attorney, Agent, or Firm* — Moser Taboada

(57) ABSTRACT

A method and apparatus for encoding an image is disclosed. A decomposition circuit comprises a set of pixel filters used to identify picture pixels, background pixels and text pixels of the image. An image encoding circuit comprises a lossy discrete transform encoder for encoding the picture pixels, a constant color lossless encoder for encoding the background pixels, and a discrete color lossless encoder for encoding the text pixels.

9 Claims, 29 Drawing Sheets

FIG. 10
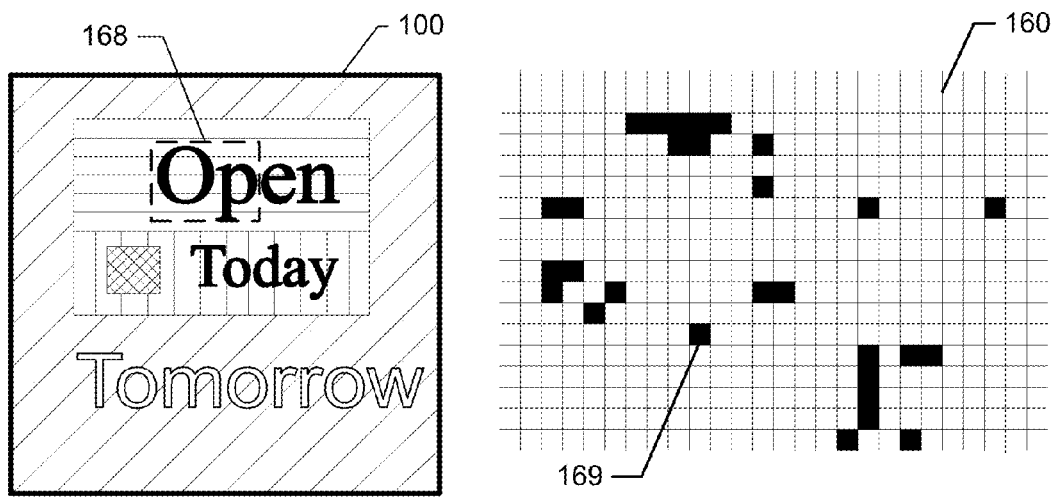
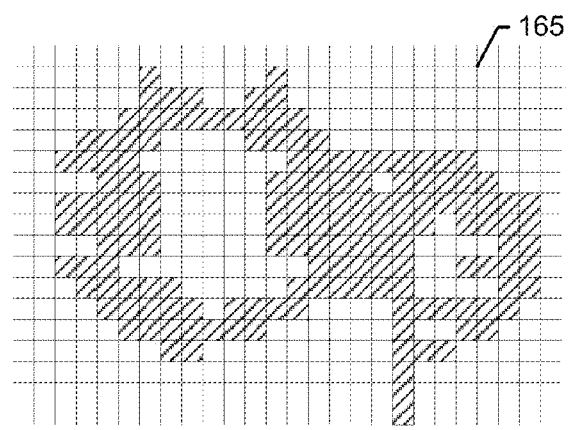

Pixel Table
T - Text Pixel
B - Background Pixel
C - Color Match Pixel

Pixel Table
A - Text Pixel
B - Background Pixel

FIG. 17
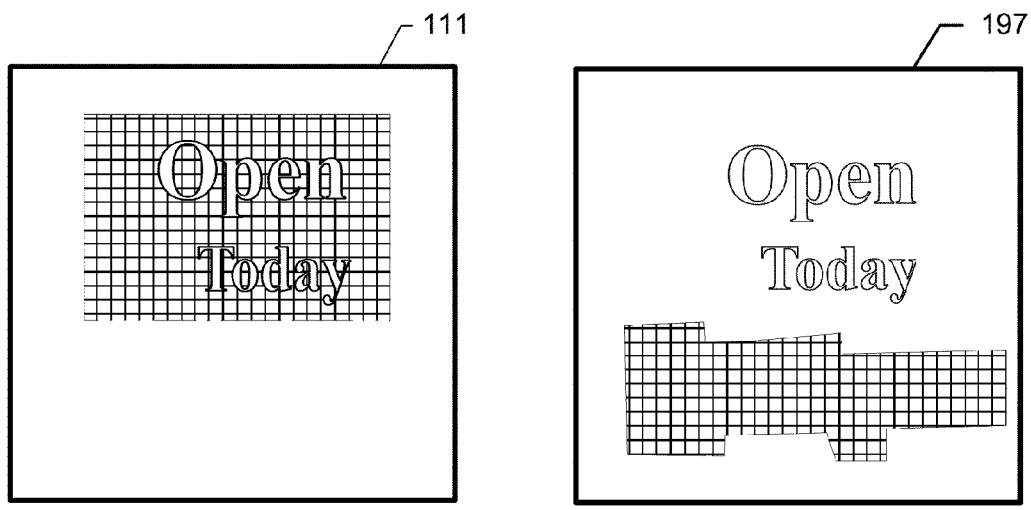
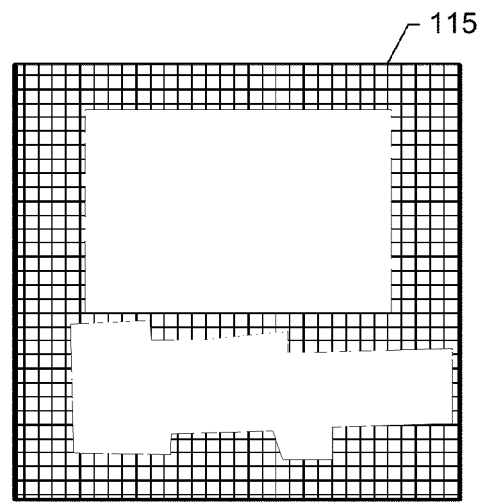

US 8,442,311 B1

APPARATUS AND METHOD FOR ENCODING AN IMAGE GENERATED IN PART BY GRAPHICAL COMMANDS

CROSS-REFERENCE TO RELATED APPLICATIONS

This application is a continuation-in-part of co-pending U.S. patent application Ser. No. 11/173,303, filed Jun. 30, 2005, which claims benefit of U.S. provisional patent application Ser. No. 60/584,869 filed Jun. 30, 2004 and is also a continuation-in-part of co-pending U.S. patent application Ser. No. 11/333,955, filed Jan. 17, 2006, which claims benefit of U.S. provisional patent application Ser. No. 60/703,767, filed Jul. 28, 2005. Each of the aforementioned related patent applications is herein incorporated by reference in its entirety.

BACKGROUND OF THE INVENTION

1. Field of the Invention

The present invention relates broadly to encoding computer display images for communications across a network. Specifically, the present invention relates to applying decomposition methods, compressing and transmitting images rendered by a processing system. More specifically, the present invention relates to display images in a frame buffer that are accessed, compressed and transmitted in priority sequence with the aid of multi-layer image decomposition performed by the processing system in conjunction with drawing command hints issued by a processor.

2. Description of the Related Art

Masked wavelets have been used to improve the compression of natural images with superimposed text or lines images, as might be characteristic of a computer display image that requires compression in order for it to be transmitted to a remote system. Generally, some form of pixel-level image filter is applied to the image in order for select areas of the image which are better suited to alternative encoding methods are designated as "don't care" regions, and these areas are excluded from the wavelet compression process.

However, pixel level pre-processing of an image to determine its characteristics prior to encoding is a processing intensive task, especially when performed by computing resources also tasked with maintaining a high quality user experience by servicing latency-sensitive functions such as image rendering and application software processing.

Therefore, there is a need in the art for a system and method for improving the performance of image decomposition in such a manner as to overcome degradation in the user experience.

SUMMARY OF THE INVENTION

Embodiments of the present invention generally relate to a method and apparatus for efficient communication of encoded computer display images between host and remote systems across a network by providing an encoding system that applies multi-layer image decomposition techniques based in part upon the interpretation of drawing commands in advance of concurrent encoding of lossy and lossless image parts.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 illustrates a subsection of the text image mask identified by the saturated pixel filter and pixel pattern filters;

FIG. 17 illustrates the generation of the picture mask that is generated by identifying all of the pixels that are neither text nor background;

DETAILED DESCRIPTION

The present invention discloses a system and method for preparation of a computer display image for efficient encoding so that the encoded computer display may be transmitted across the network and accurately reproduced at the remote computer. Embodiments of the present invention decompose a computer display image into different layer types and associated masks based on the unique nature of the image. These include text, object, background and picture layer types. A set of image masks is used to uniquely identify different layer types within an image, where each layer type includes none, some or all of the pixels of the original image. Each layer of the image is processed prior to transmission (i.e. compressed) using a lossy or lossless encoding method appropriate for the characteristics of that layer.

In order to determine if a pixel from the original image is represented on a layer, each layer is assigned a single-bit pixel mask of the same dimensions of the original image. If a pixel from the original image is represented on a layer, the corresponding bit in the pixel mask for that layer is set. Once the image is decomposed, the original image and the mask is forwarded to the processing method defined for that layer and the mask is used by the processing method to identify which pixels of the image should be processed.

Figure 1:
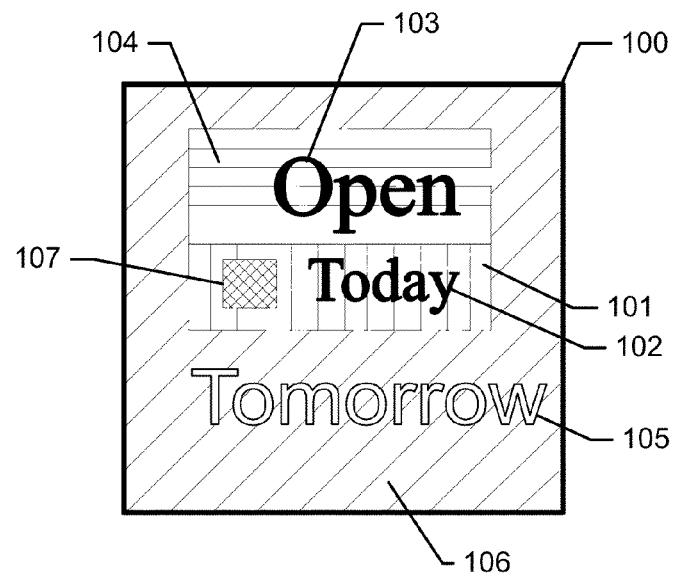
FIG. 1 illustrates a representation of a grayscale image containing image types that might be found on a computer display.

FIG. 1 represents a grayscale or color image 100 that exemplifies a section of a computer display image. The section is composed of text and other image artifacts on a variety of different backgrounds. The underlying background for the entire section is a picture background as represented by area 106. For example, area 106 might be a photograph. Area 106 is overlaid with text 105 "Tomorrow" and two styles of boxes, each with additional text overlays. Box 104 represents a vertical gradient in color tone. Box 104 is overlaid with black text "Open" 103. Box 101 has a single gray tone and is overlaid by anti-aliased text "Today" 102 and small square object 107 of a different gray tone.

Embodiments of the present invention decompose image 100 into layers of different image types and corresponding masks as in preparation for image compression. Each mask is generally implemented as an array, i.e. each mask is a map of one-bit pixels of image 100 where a bit value of 1 positively identifies a pixel as an element of that mask. In one case, image 100 is decomposed into four mutually exclusive layers, so therefore a mask set that defines image 100 comprises a two-dimensional array (of the same dimension as image 100) with each array element defined as a two bit value. In such a case, each two-bit value describes four different states and each state identifying the presence of a pixel on one of the four layers of the image. In alternative embodiments, for example in cases where the masks are not mutually exclusive or cases where fewer or more than four masks are defined, other structures including single-bit or three bit elements are used.

In some embodiments, one or more masks comprise information related to drawing commands associated with the rendering of image 100 in a frame buffer. In one such embodiment, additional mask layers are defined for lossy and lossless image types as classified through the interpretation of the drawing commands. Lossy image types include rendered Joint Photographic Experts Group (JPEG) files, computer wallpapers and the like while lossless image types include rendered text and icons. Such classified image areas are thereby enabled to bypass pixel level filtering processes described herein and be forwarded directly to downstream lossless or lossy encoding methods. In another such embodiment, a mask layer is defined for video image type in which case the classified area of image 100 is processed using a video encoding method which may perform lossy encoding of rendered pixels, transcoding of the source video stream or forwarding of the source video stream to the remote computer in different embodiments.

FIGS. 2A through 2E show an image decomposed into five image types, each type associated with its own mask. The five types of images include background, text, picture, type 1 object, and type 2 object. In an embodiment, the object image type (i.e. type 1 or type 2) is selected dependent on the background characteristics for the objects.

Figure 2A:
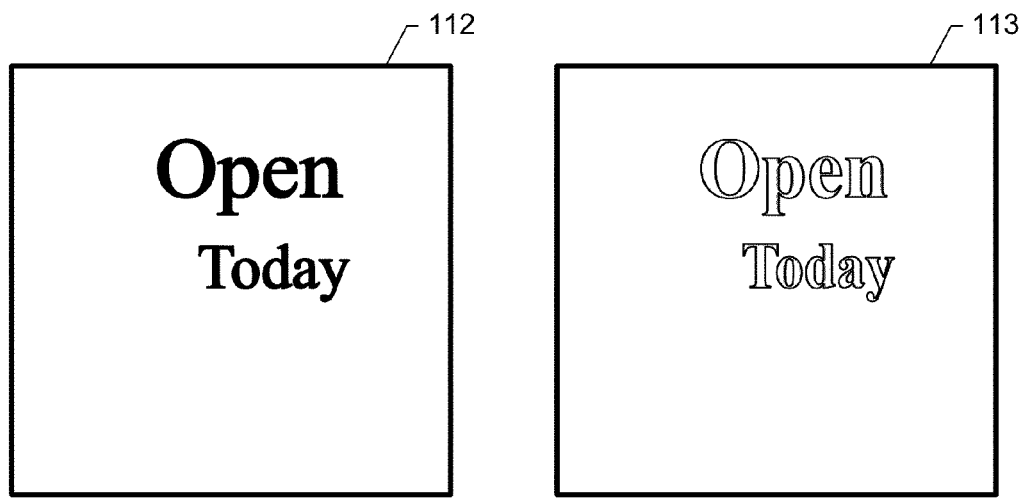
FIGS. 2A-2E illustrate the decomposition of an exemplary image into five different image layers and masks.
Figure 2B:
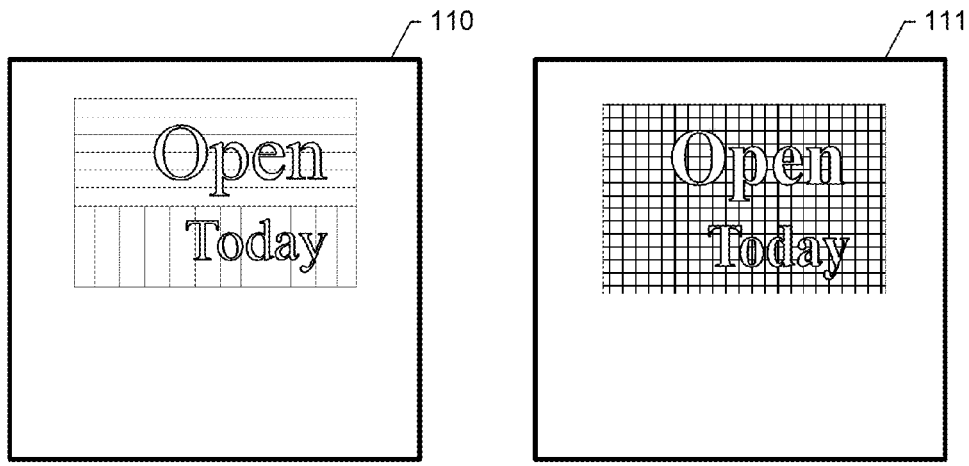

Text image types are generally encoded using lossless or high quality lossy methods to ensure accurate reproduction. Referring to FIGS. 2A and 2B, text image type 112 is identified by text mask 113. Text image type 112 is defined by any small high-contrast area that is surrounded by a background image with characteristics that enable the background image to be described using one or more graphical primitives. Background image type 110 in FIG. 2B, as identified by background mask 111 represents such a background image type. In an embodiment, the basic graphical primitive is a line. Multiple lines of the same color represent solid color areas 101. Multiple lines of different colors represent gradient areas 104 of the background. When image 100 is regenerated, regions of text image type 112 overwrite the regions of background image type 110, thus enabling the background image to be defined as continuous graphical objects through the text regions.

To maximize the area of regions comprising background image type 110 without constraint by regions of text, the decomposition process first identifies regions of text image (identified by text mask 113) which are then marked as "don't-care" regions for the subsequent background decomposition analysis. Using this approach, areas of background image may be specified as simple graphics descriptors that define long lines of the same length and the same color. Such descriptors are efficiently compressed and enable lossless background image reproduction.

Figure 2C:
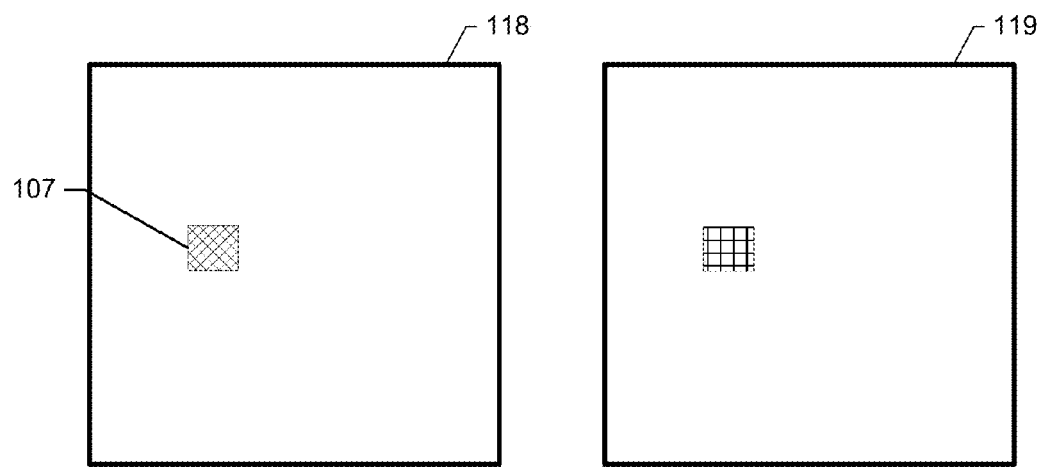
Figure 2D:
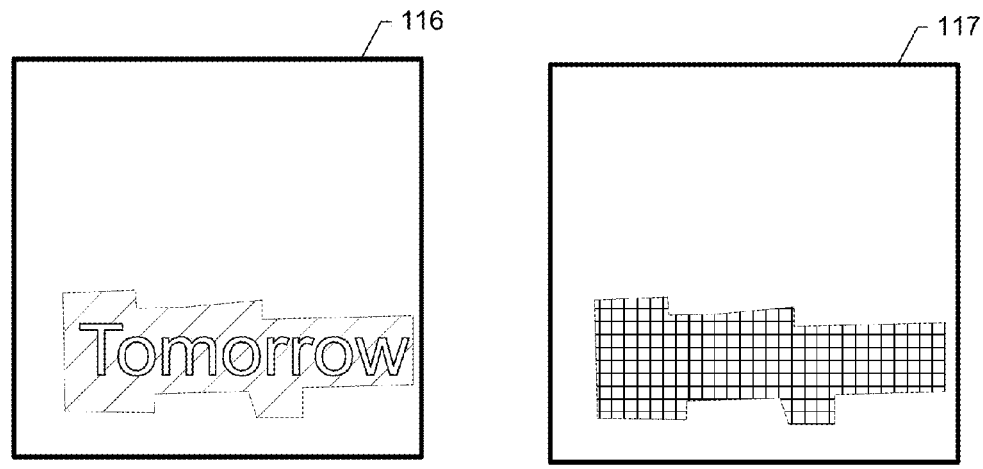

FIG. 2C and FIG. 2D distinguish between two types of objects (herein referred to as 'type 1' and 'type 2' objects) which may be processed by separate compression methods. Type 1 objects are defined as small, low-contrast regions that are surrounded by background or text and are typically reconstructed using lossless techniques. Type 1 object image type 118 of FIG. 2C comprises small square 107 with corresponding type 1 object mask 119. Type 2 objects are defined as text, graphics, icons, or other high-contrast regions that are at least partially surrounded by pixels of a picture image type and may be compressed using either lossless or high quality lossy compression techniques. Type 2 object image type 116 of FIG. 2D comprises text 105 of image 100 116 with corresponding type 2 object mask 117.

Figure 2E:
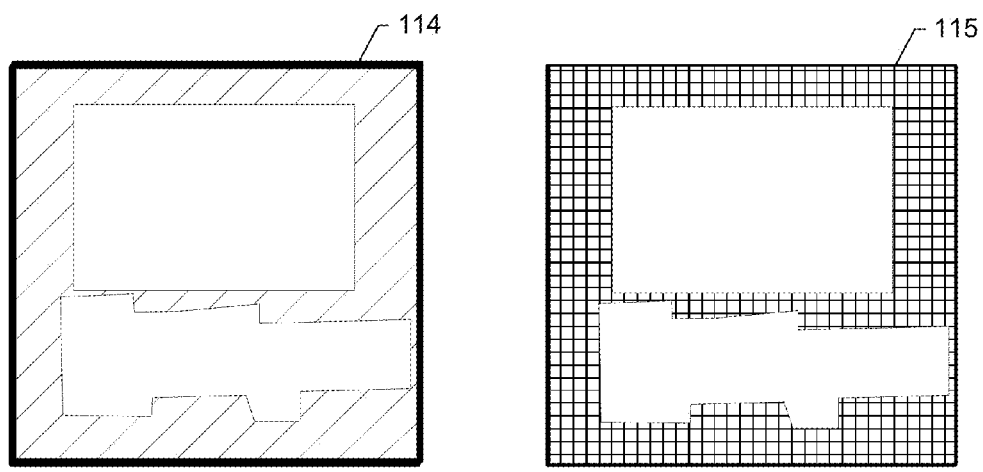

FIG. 2E shows picture image type 114 comprising the remaining areas of image 100 not previously defined by the text, object or background image masks and corresponding picture mask 115. The picture area generally comprises a region suited to photographic compression techniques (e.g. photographs or other textured images) without high-contrast detail of text or objects or the flat graphic nature of background image areas.

Figure 3:
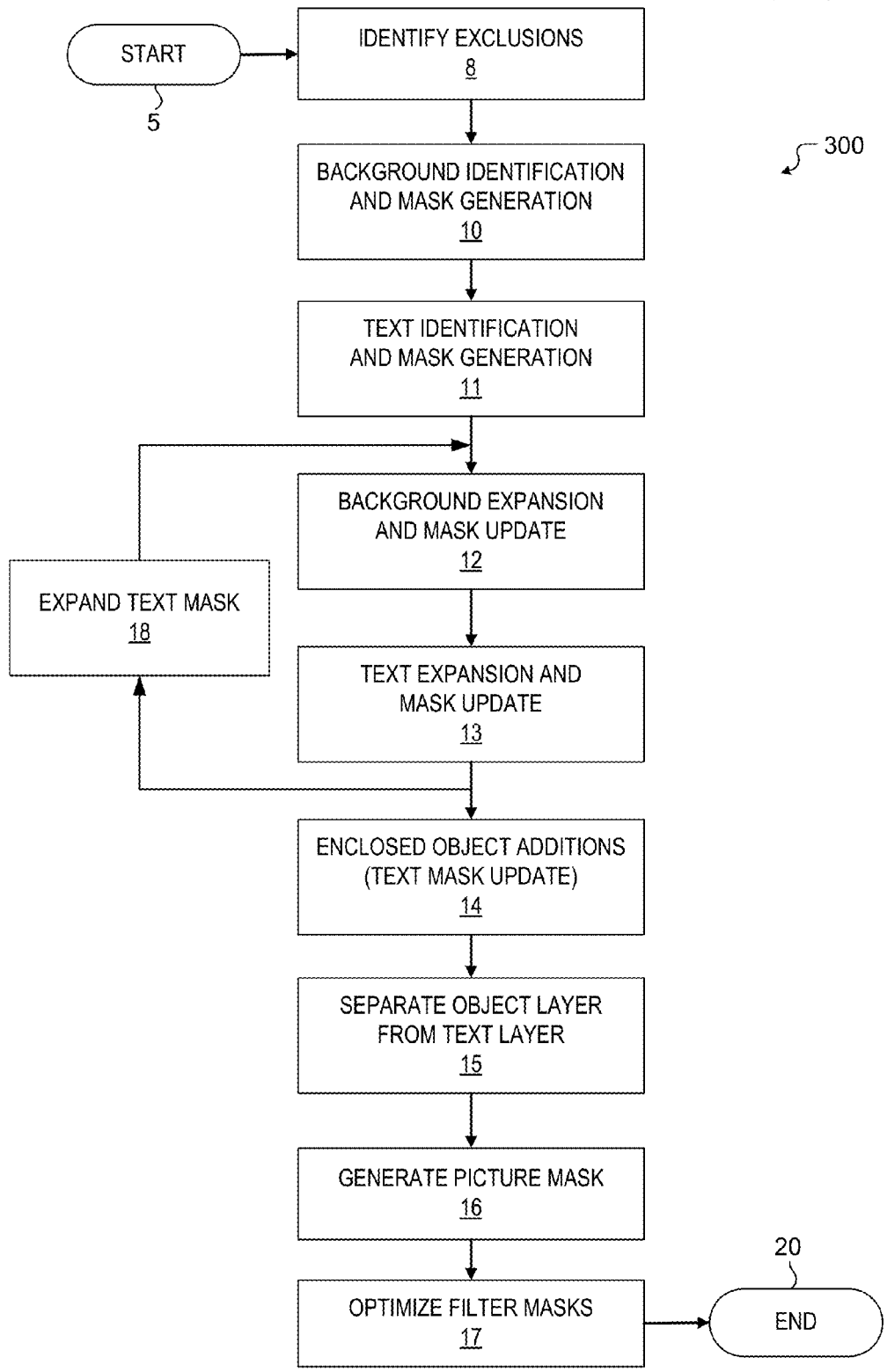
FIG. 3 illustrates in flow chart form the image decomposition method.

FIG. 3 illustrates image decomposition process 300. Process 300 starts at step 5 and proceeds to step 8 ("Identify exclusions") in which areas of the image 100 are identified for exclusion from further pixel-level decomposition steps. In an embodiment, drawing commands related to the image rendering process are interpreted for hints that identify one or more regions of the image suitable for exclusion from the remaining steps of process 300. Such regions may be flagged, for example by setting related bits on an exclusion mask and generating a related dataset of explicit encoding descriptors which are made available to downstream encoding processes.

Process 300 proceeds to step 10 ("Background Identification and Mask Generation"). Step 10 identifies and marks background image areas suitable for identification before other image types are identified. Process 300 proceeds to step 11 ("Text Identification and Mask Generation") in which high-contrast filters, including saturated pixel filters and other pixel pattern filters, are used to identify and mark high-contrast areas including text, graphics or icons. Following step 11, the text mask contains both text images and type 2 object types. Process 300 proceeds to step 12 ("Background Expansion and Mask Update") in which the background mask is updated to include areas that have been marked in the text mask as additional background areas in the background mask. Process 300 proceeds to step 13 ("Text Expansion and Mask Update") in which the updated background mask is used as a reference to clear the text mask of pixels that are assigned as both text and background pixels. In some embodiments, optional step 18 attempts to expand the text mask through iterations of steps 12 and 13 until a desired level of quality is achieved for the text mask and the background mask. Process 300 proceeds to step 14 ("Enclosed Object Additions") in which small areas that are not identified in the text or background masks are reviewed based on the image type of neighboring pixels. Small areas adjacent to text, background, or type 1 objects are generally reclassified as text image type. Process 300 proceeds to step 15 (Separate Object Layer from Text Layer") in which the text mask is divided into two layers i.e. an object layer associated with type 2 object image 116 and text image layer associated with text image type 112. The object layer consists of areas on the original text mask that are not fully surrounded by background. Pixels in the object layer are removed from the text mask and placed in the object mask. The text layer consists of areas on the original text mask that are fully surrounded by background. Pixels in the text layer remain on the text mask. Process 300 proceeds to step 16 ("Generate Picture Mask") in which pixels that are not already identified as text, objects or background are identified as picture pixels in the picture mask. Process 300 proceeds to step 17 ("Optimize Filter Mask") in which the mask set is filtered to reassign small, isolated image regions that may hinder optimum compression and can be reclassified without degrading the image quality. Process 300 ends at step 20.

Figure 4:
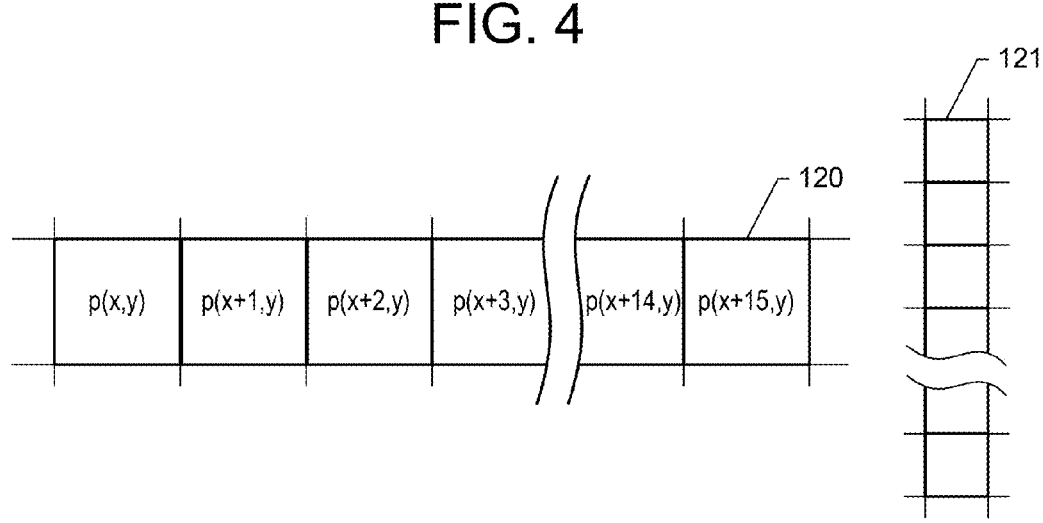
FIG. 4 illustrates a filter used to identify background images.

FIG. 4 illustrates a filter suitable for use to identify background pixels that are candidates for coding as graphical objects. The filter seeks horizontal area 120 or vertical rectangular area 121 of dimension m by n pixels as referenced in formula (1). Each pixel p(x,y) is tested for a background match. Pixels that are either exactly matched in color or within a defined limit of color "d" are identified and marked as background pixels:

For series i={1, 2, 3, ..., m} and j={1, 2, 3, ..., n}

$$|p(x,y)-p(x+i,y+i)|<=d \qquad (1)$$

Such a filter seeks a line of adjacent pixels that is 16 pixels in length with all pixels matching in color. A variation of this filter allows small variations in color. In cases where these variations are not factored into the graphics primitive for the background, the compression process reduces the image quality. Other variations include rectangular area filters, diagonal lines, dotted or dashed lines, or color lines of even gradient to identify background pixels, or a graphic descriptor that determine a default background color for an area or an entire display.

Figure 5:
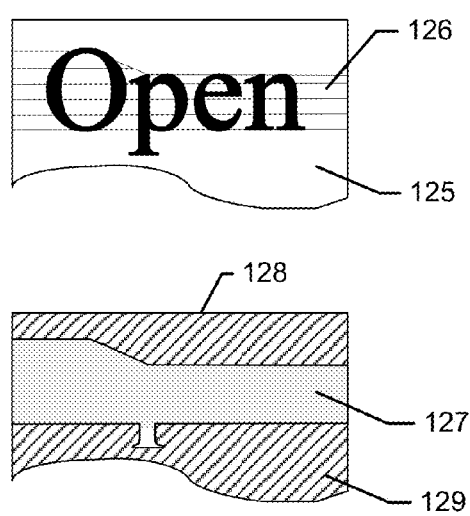
FIG. 5 illustrates a subsection of the background image mask identified by the first pass of the background filter.

FIG. 5 illustrates a subsection of image 100 transformed using background identification and mask generation steps of process 300. Gradient background area 125 is removed from the image where lines of color-matched pixels are identified (e.g. lines comprising 16 color-matched pixels in an exemplary case). However, due to the presence of text and other artifacts, some of gradient area 126 does not comprise lines of pixels identified by such color-mapped lines so they are not identified as background pixels. Region 129 on resulting background mask 128 shows the area that has been removed from the image and remaining region 127 indicates where the background has not been removed. This filter process has similar results for constant color background region 101. All regions where lines of constant color (e.g. 16 pixels in length) that don't intersect text 102 or object 107 are moved to the background mask.

Figure 6:
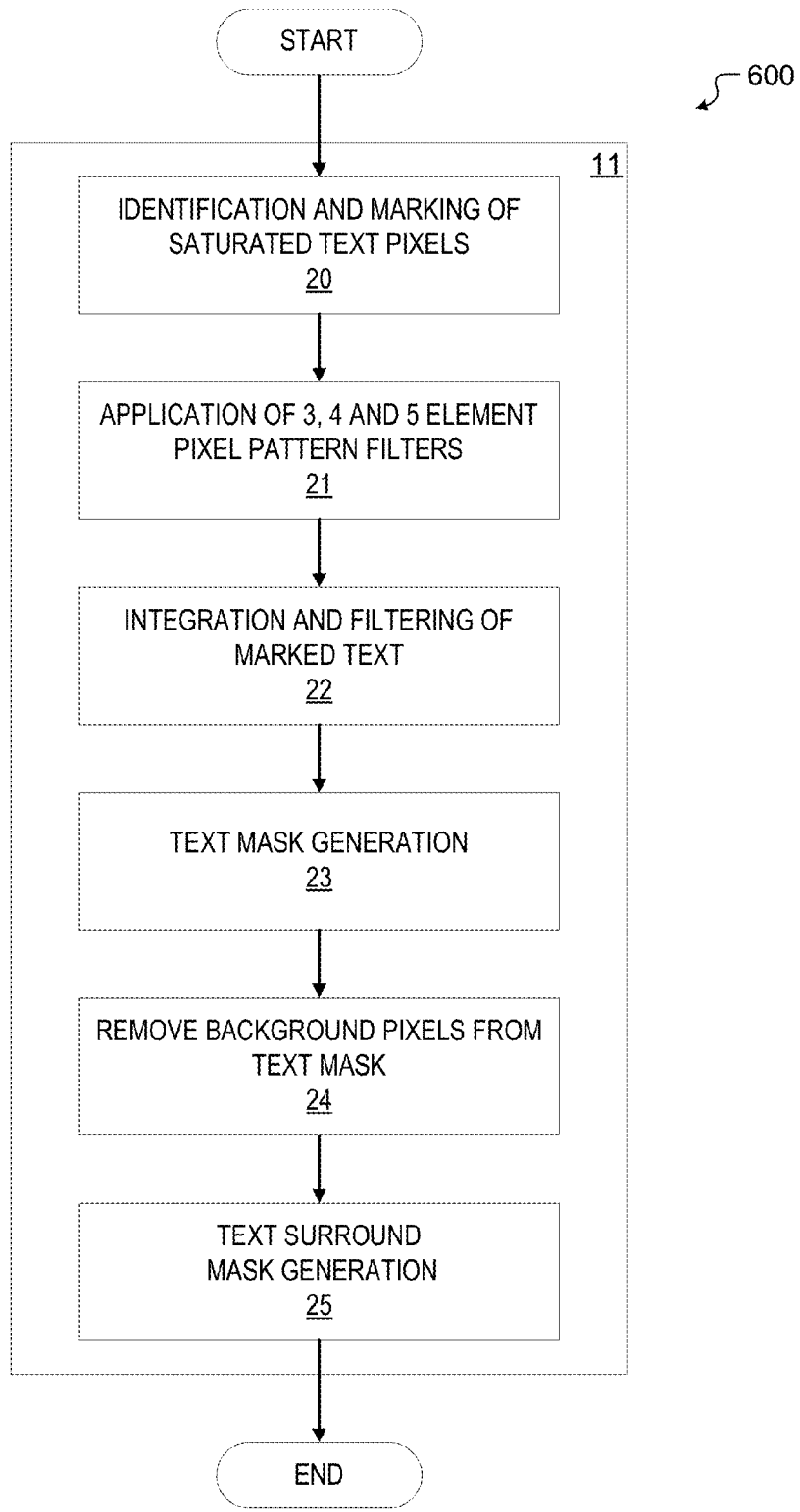
FIG. 6 illustrates in flow chart form the text identification method.

FIG. 6 shows process 600 which is an embodiment of text identification step 11 in process 300 used to identify high-contrast text areas such as text, icons and high-contrast graphic objects designated for lossless compression. Text and high-contrast type 2 objects are identified using the same filters and classified separately as a subsequent decomposition step based on different background characteristics. Therefore, the term "text" referenced in conjunction with process 600 refers to both text image types (i.e. type 112) and type 2 object image types.

To meet an underlying need for accurate text reproduction, a conservative analysis for text identification is generally prudent. While accidental classification of non-text areas as text areas does not impact image quality, text areas should always be correctly identified to ensure lossless compression. Graphical images that happen to incorporate lines of a constant color (e.g. line of 16 pixels) are generally decomposed onto the background layer rather than the text layer if they are identified by the background filter. This may decrease the overall compression ratio but both the background and high-contrast features are reproduced accurately.

Based on the variety of shapes and forms expected for text, embodiments of the present invention use a series of contrast filters in conjunction with an accumulated pixel density integration filter to positively identify text pixels. Each contrast filter is applied to the image and marks are assigned to individual pixels identified as text prospects. Once the image has been processed by the series of contrast filters, the marks for each pixel are accumulated and the image is filtered by the pixel density integration filter to select only areas that have a high density of text markings.

Process 600 starts at step 20 ("Identification and Marking of Saturated Text Pixels") in which a first filter method identifies and marks saturated text pixels. Due to their vivid nature, saturated pixels in computer display images have a high probability of being text. In a 24-bit color space embodiment, a saturated color in Red Green Blue (RGB) space is defined as any color where R, G and B are each 0 or 255, where each RGB color is represented by an 8-bit value. For a grayscale embodiment, these values correspond to the values used for the colors black and white. The mere presence of saturated color pixels does not guarantee that the pixels are text so the saturated color pixel needs to be adjacent to a pixel of contrasting color. The filter seeks saturated color pixels with the additional constraint that each be adjacent to a pixel of reasonably high-contrast. Background pixels are usually saturated, so an additional constraint is that the saturated pixel should not be a background pixel as determined by previous filters.

Process 600 proceeds to step 21 ("Application of 3, 4, and 5 Element Pixel Patterns") in which pixel regions of various sizes that match, either exactly or within some predefined difference, pre-determined pixel patterns. These pixel patterns are based on the expected color gradient and contour of text. In addition these pixel patterns may include the expected location of background pixels (where a background pixel is a pixel that has been detected by the aforementioned background filter). In an embodiment multiple pixel pattern filters that compare groups of 1×3, 1×4 or 1×5 regions of pixels are applied to the image to determine which pixels are assigned text pixel markings.

Process 600 proceeds to step 22 ("Integration and Filtering of Marked Text") in which prospective text pixels receive multiple markings from the multiple pixel pattern filters. Once all of the text filters have been applied, the marks are accumulated and integrated over a small area. The output of the integration filter is a value that is used to measure if the area has a sufficient density of text marks. If the area passes the threshold, then all text marks in that area of the text mask identify text pixels. If the area does not pass the threshold, then all text markings are considered to be noise and the text marks in that area are removed.

Process 600 proceeds to step 23 ("Text Mask Generation") in which the remaining text pixel markings are converted into a text mask after the text pixel markings determined to indicate noise have been removed. Indicia for pixels that are identified as both text and background are also removed from a text mask as step 24 ("Remove Background Pixels from Text Mask").

Following step 24, the text mask contains both text and high-contrast objects. These high-contrast objects are removed from the text mask by a later filter. Text indication is not a perfect process and not every text pixel is positively identified by the aforementioned pixel patterns. As a next step 25 (Text Surround Mask Generation"), a blocking operation is performed to mark the pixels surrounding text pixels to ensure the mask is expanded to include all text pixels. The expanded area is also useful for background identification.

Figure 7:
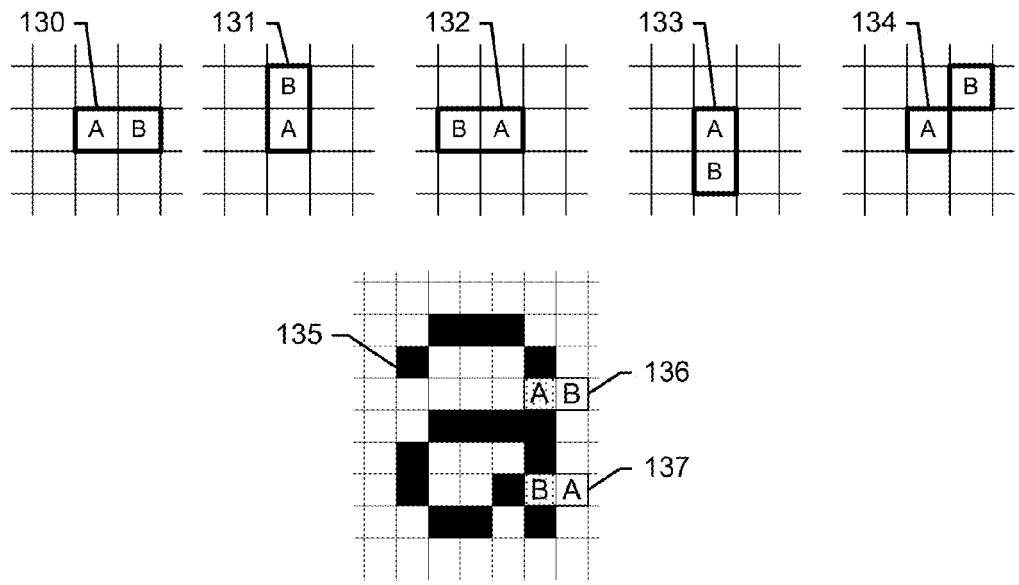
FIG. 7 illustrates a saturated pixel text filter.

FIG. 7 illustrates a saturated pixel filter used to accurately identify text. While such saturated text identification is valid for computer-generated images that have maintained their original, digitally-specified pixel values, images that are scanned or pass through an analog transformation are less suited to such identification. Saturated color is used to mark pixels as potential text areas, the marks are summed and combined with the marks from pixel pattern filters to determine if the pixels are to be positively identified as text. One embodiment of the filter operates on an 8-bit grayscale image format where saturated black pixels have a value of 0 and saturated white pixels have a value of 255. This allows the filter to work with both black and white text. The saturated pixel filter requires that a minimum color difference exists between the saturated pixel and an adjacent pixel. Specifically, referring to FIG. 7, pixel A is marked as text according to formulas (2) and (3):

$$|A-B|>=d \quad (2)$$

and $$A=\text{0xFF or 0x00} \quad (3)$$

and

A is not a background pixel, where d is the minimum specified color difference.

Pixel B may be to the right 130, left 132, above 131 or below 133 the saturated color pixel A. The saturated pixel filter may be applied in multiple directions, for example in some embodiments, diagonal filter 134 is also used.

FIG. 7 shows an example of the "a" character as 5×7 pixel array 135. If the character pixels are black (or of value 0) and the background contrast is greater than the minimum required color difference, then both of the pixels are marked as text pixels multiple times. Regarding pixel pair 136, pixel 'A' will be marked as text according to the formula. To prevent both the text and background pixels from being marked as text in an image where the background is white (or 255 in an 8-bit grayscale image), the filter requires that the saturated pixel is not also a background pixel in order for the text pixel to be identified. For example 'A' is not identified as text in the application of filter 137.

Anti-aliased text does not comprise boundaries as sharp as standard, aliased text. As such, saturated pixels in anti-aliased text are normally adjacent to gray pixels and the color difference between them may not meet the minimum difference requirement. A variation better suited to anti-aliased text, measures the contrast between the saturated pixel 'A' and the pixel 'B' where 'B' is two pixels away from A rather than directly adjacent as shown for pixel pair 136. In such an embodiment, the middle pixel (between pixel A and pixel B) is either not considered in the filter equation or the filter coefficient for that pixel has a reduced weighting. For example, a weighted average value may be calculated across the two non-saturated pixels where the weighting for the center pixel is lower than the weighting for the outer pixel. This averaged contrast level is then used to determine if a contrast threshold is exceeded.

In another embodiment, color pixels that are saturated in one or two of the R, G, or B levels are also considered for text identification. However, the probability of false detection increases as the number of saturated colors is reduced from three to two or one. The probability of errors further increases as the filter width increases. In these cases, additional filtering is required to remove the unwanted detections. For example, one approach decreases the contrast threshold between the saturated color pixel and the adjacent pixel that positively identifies the color pixel as text.

Figure 8:
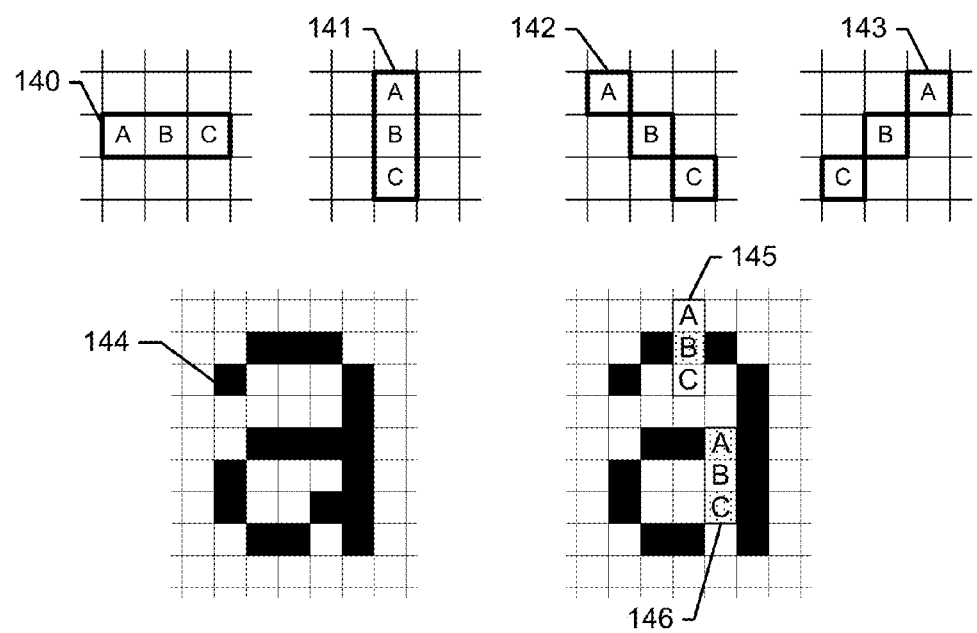
FIG. 8 illustrates a 3-pixel pattern filter.

FIG. 8 illustrates a 3-pixel filter that takes advantage of two types of 1×3 pixel patterns generally present in a noiseless computer display generated image. FIG. 8 shows the character "a" 144. The pattern 145 accounts for the background in a digital image being precisely constant without any noise and therefore A and C are exactly equal. The pattern 146 accounts for pixels contained in the same text character being exactly equal and therefore A and C are exactly equal. Non-digital pictures do not typically exhibit this characteristic, which may be used as a further identifier of text. By not enforcing a strict match to the pixel pattern this filter can also look for color gradients on either side of a text pixel. In various embodiments, the 3-pixel filter is applied in multiple directions including horizontal 140, vertical 141, and diagonal directions 142 and 143. The 1×3 pixel pattern filter is enabled to detect text written over a picture because pictures are generally insufficiently flat to have matching pixels on either side of a text pixel. However text written on top of pictures is usually written with opaque pixels in which case two pixels of the same character or adjacent characters are likely to have the exact same color and can be separated by a picture background that meets the minimum contrast difference requirement.

An embodiment of the 3-pixel filter comprises two control values for determining if pixel or group of pixels matches this pattern and should be marked as text. The first control value is the minimum difference between the center pixel and the nearest outside pixel. The second control value is the maximum difference between the two outer pixels. While the minimum difference of the center pixel need not be large if the end pixels are identical, in cases where the maximum allowable difference between the end pixels is increased, the center pixel minimum difference should also be increased to prevent excessive false text markings. An optional parameter for the filter is to use the background information to determine if a pixel is text. Pixels A, B and C are marked as text according to the criteria in expressions (4) and (5) below:

$$|A-C| <= \text{maximum difference between the two outside pixels} \quad (4)$$

and $$|A-B| >= \text{minimum difference between center pixel and nearest outside pixel and optionally A and/or B are background pixels} \quad (5)$$

If there are background pixels at both ends of the filter, and the center pixel is not a background pixel, then there is a high probability that the center pixel is a text pixel. If only one end of the filter is an identified background pixel but there is minimal difference between the two ends, then there is a reasonable probability that the text is on a gradient background. In cases where a pixel identified as a background pixel is under filter examination, the other two parameters may be reduced without increased false text detection.

Figure 9:
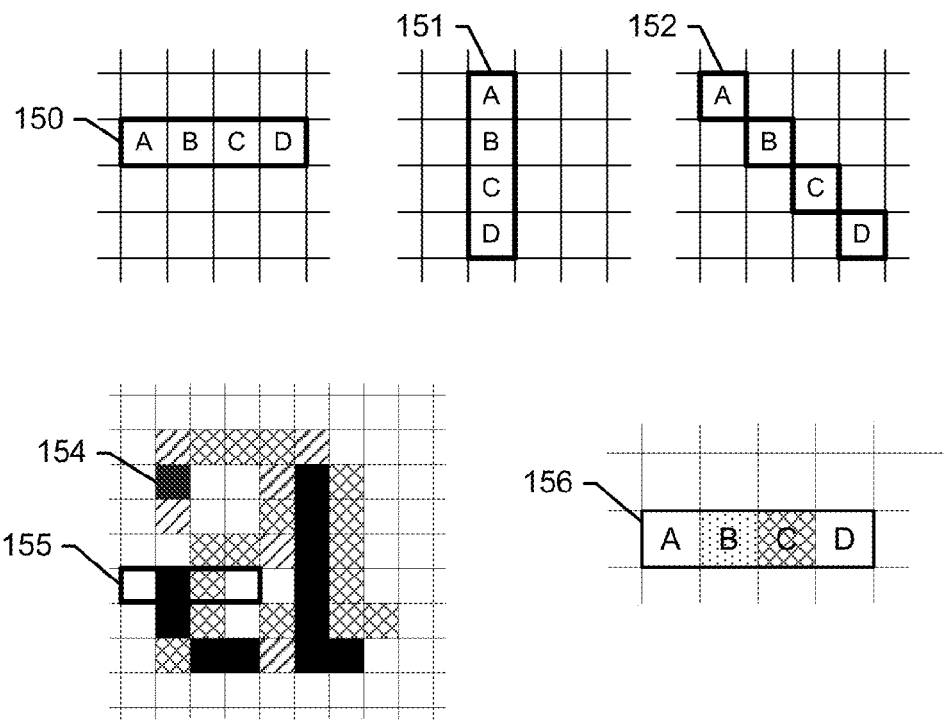
FIG. 9 illustrates a 4-pixel pattern filter.

FIG. 9 illustrates a 4-pixel filter 155 applied to an anti-aliased character "a" 154. The different crosshatch representations for different pixels in the illustration represent different grayscale levels that comprise the anti-aliased "a" character. Filter 155 may be applied in multiple orientations 150, 151 and 152. In an application of filter 155, pixels 'A', 'B', 'C' and 'D' of FIG. 9 are marked as text if the following conditions are met:

$$|A-D| <= \text{maximum difference} \quad (6)$$

and $$(|A-B| >= \text{minimum difference or } |C-D| >= \text{minimum difference}) \quad (7)$$

4-Pixel filter 155 also depends on the background in a digital image being precisely constant without any noise i.e. pixels |A−D|<=maximum difference as the filter covers adjacent text pixels B and C on background pixels A and D 156. Filter 155 also utilizes the characteristics that text pixels are general surrounded by pixels of high-contrast e.g. |A−B|>=minimum difference or |C−D|>=minimum difference for readability purposes.

An application of a 1×4 pixel pattern that accounts for pixels in the same text character being exactly equal comprises pixels A, B, C and D marked as text using the middle pixels according to the expression:

$$|B-C| <= \text{maximum difference} \quad (8)$$

and $$|A-B| >= \text{minimum difference} \quad (9)$$

and $$|C-D| >= \text{minimum difference} \quad (10)$$

The 1×4 pixel pattern filter may be applied to detect large font over a wide area of flat text. In addition, some pixel patterns associated with small fonts can only be properly expressed by a 1×4 pixel pattern. A variation on the 4-pixel filter uses background pixel information to improve the search in a similar mode to the 1×3 pattern filter. Pixel pattern filters of 1×5 format are also useful for detecting wider text. While the simple n×m pixel pattern recognition works well for small values of n and m, as the pixel pattern increases in size, it loses its suitability to capturing generic text characteristics and becomes better suited to character recognition applications.

FIG. 10 shows area 168 of image 100 after the text filters have been applied. Pixels that are marked are illustrated as pixel marks on pixel map 165 while those that have not been detected by any of the text filters are shown as pixels 169 on pixel map 160. The text filtering process results in numerous text markings in areas of high text density, a few markings in areas where text appears over a picture and infrequent markings in other regions of the image, for example regions where a picture has localized areas of high contrast. Pixel map 165 shows the filtered pixel data for pixels that have accumulated at least one positive marking. As discussed previously, text pixels typically have multiple markings because each text pixel may be detected by multiple filters (for example, a saturated color filter on one or more pixel pattern filters) whereas textured background pixels will have no markings or only a few markings as a result of occasional erroneous text detections.

Next, accumulated text markings provided by the text filters are filtered to evaluate the text mark density and remove erroneous text detections. If the number of text marks over a small area exceeds a defined threshold, the text pixels in that area remain marked as text pixels. In different embodiments, the weighting of text marks and the text density threshold may be varied in different areas of the image. Nevertheless, depending on how the text markings are accumulated and the defined threshold value, some false text indications may result, especially in areas where text is drawn over textured image 105.

Figure 11:
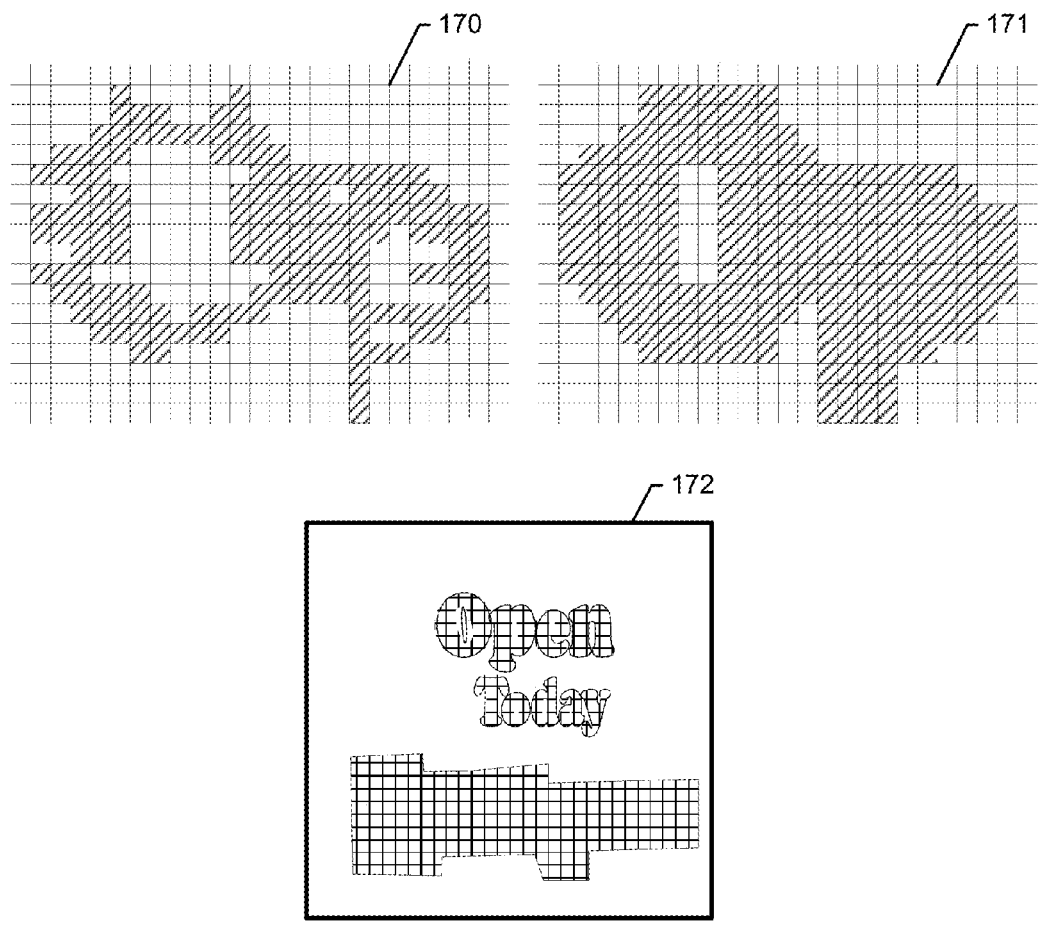
FIG. 11 illustrates a subsection of the text image mask after it has been filtered for text mark density and the text mask has been expanded.

FIG. 11 shows a text mask containing text and high-contrast objects, a result of step 25 of process 600 applied to indicated area 168 of FIG. 10. Text mask 170 of area 168 is generated in step 23. Text pixels located over background pixels have been removed at step 24. At step 25, the text mask is expanded around every text pixel which results in expanded text pixel mask 172 for image 100, of which pixel subsection 171 for area 168 is shown in FIG. 11. Although extra pixels may be captured in the process, this ensures that all of the text over a picture background area will be accurately reproduced when decompressed. Additionally, expansion of the text over the background improves identification of the actual background image.

Figure 12:
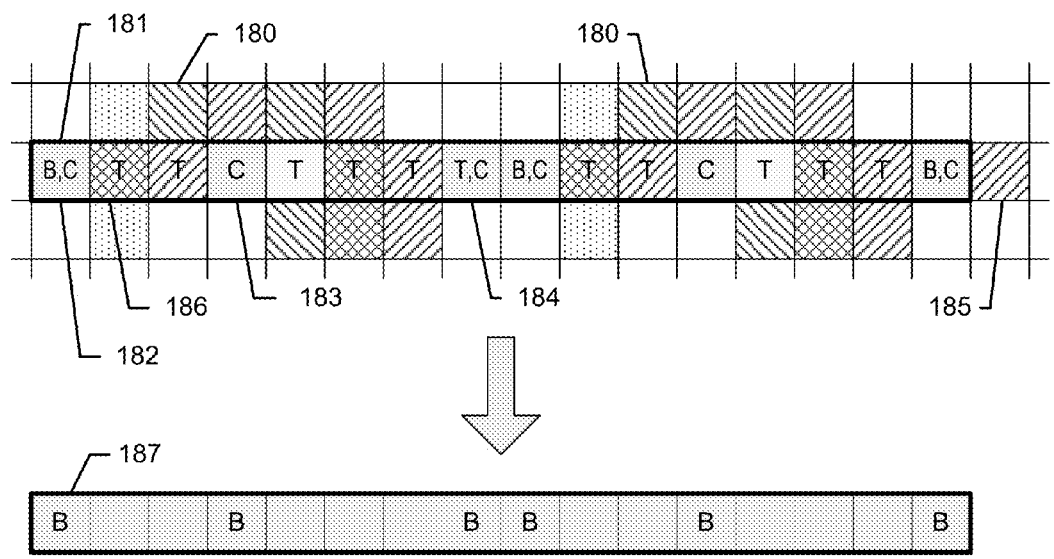
FIG. 12 illustrates a background filter used to expand the background mask by identifying background pixels enclosed by text marked pixels.

FIG. 12 illustrates pixel classification related to background expansion and mask update step 12 of process 300. Line 181 of 16 pixels is evaluated by a background modification filter. In the example of FIG. 12, the top part of two anti-aliased "a" characters is shown at reference numerals 180-1 and 180-2. For every pixel that is marked as a background pixel, the filter analyzes the next 16 pixels. While the embodiment shows the next 16 pixels to the right of background pixel 182 under analysis, the filter may alternatively be applied in other directions such as to the right, above, below or diagonally. The pixels are assigned various markings identified by the letters T, B and C, depending on specific attributes. Pixels have been identified as text pixels in the text mask are marked with a T (reference numeral 186). Pixels have been previously identified as background pixels are marked with a B. Pixels that exactly match the color of pixel 182 are marked with a C to indicate the color matching criterion. C pixels 183 and 184 are potentially background pixels and are therefore subject to further evaluation. Pixels that are marked only as text 186 are ignored as these represent the text over the background. If pixels are marked with both T and C, they have been incorrectly identified as text, probably as a result of expanding the text mask. These pixels are candidates for background pixels. If a pre-defined number of C and T pixels are found, then all potential background pixels are added to the background mask as indicated by line of pixels 187. The effect of the filter is that background inside of text is marked. For example, the area inside of the letter "O" is marked as background as a result of this process. In the case of a gradient background, the gradient lines run orthogonal to the direction of constant color. If the filter of FIG. 12 is applied both horizontally and vertically, it will also successfully detect and mark the gradient background around the text.

Figure 13:
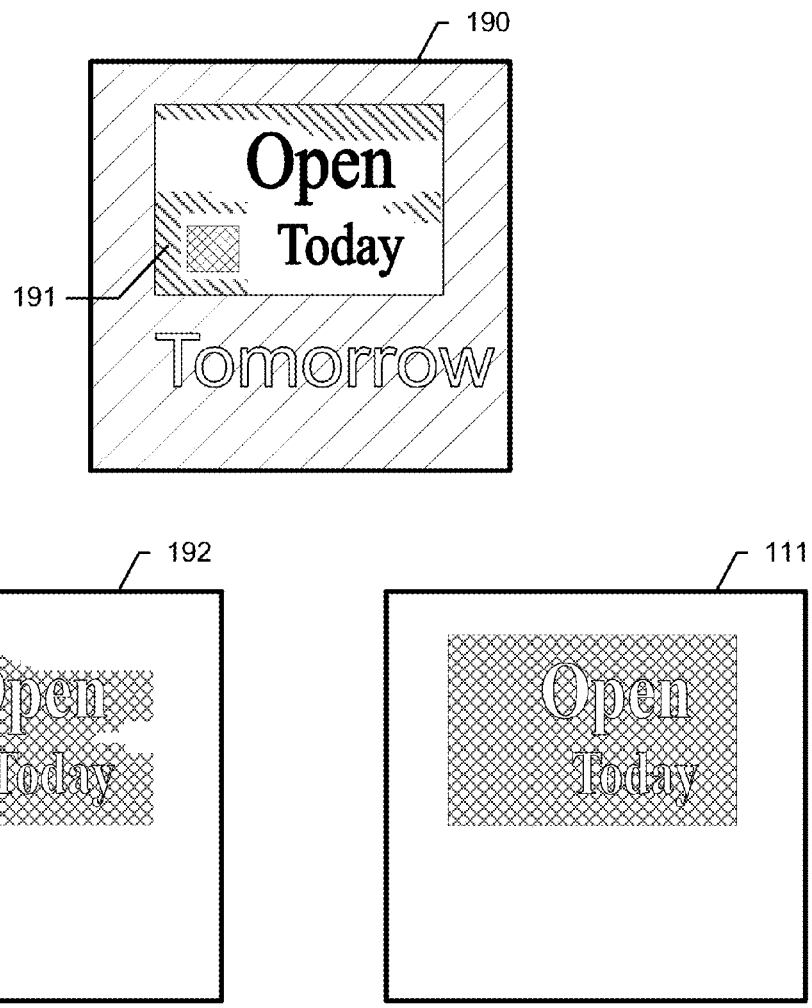
FIG. 13 illustrates the background image detected by the modified background filter.
Figure 14:
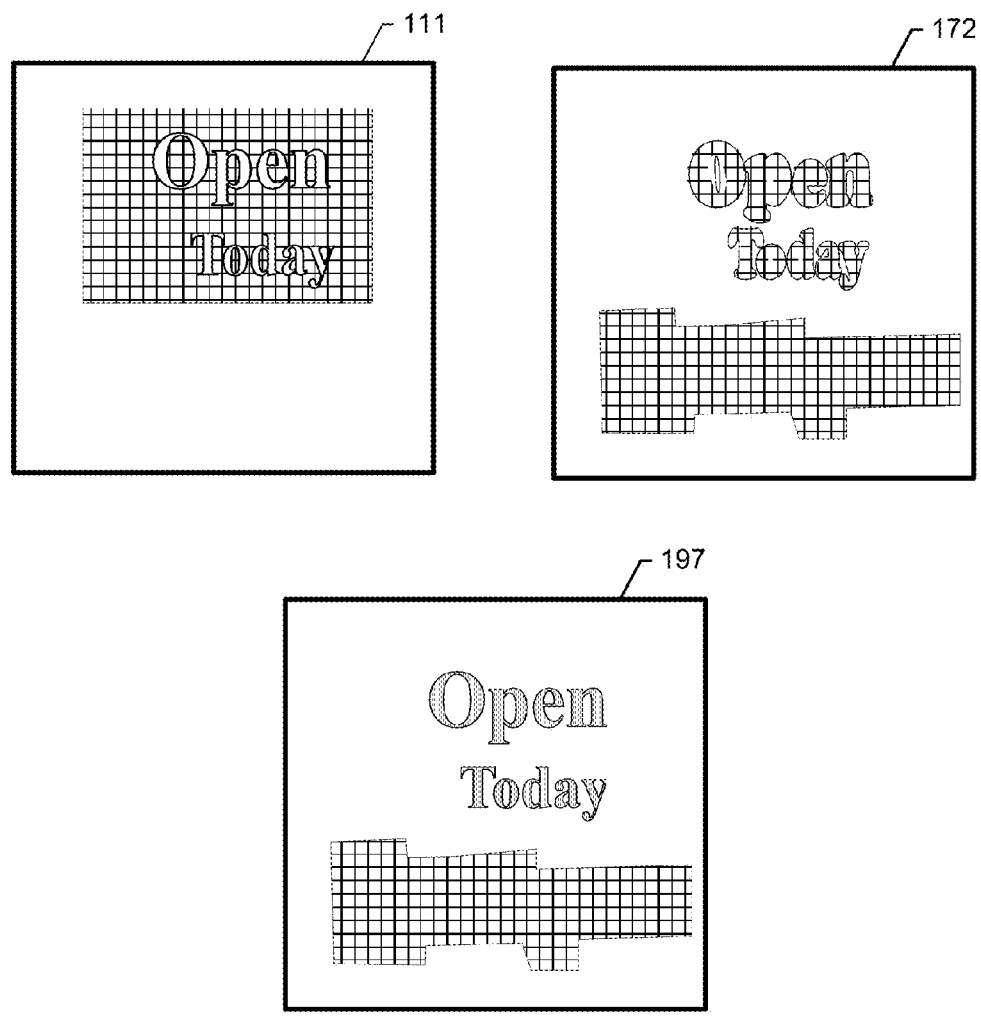
FIG. 14 illustrates the generation of the clean text mask by removing the expanded text markings that conflict with the background mask.

FIG. 13 illustrates image 190 with areas of background 191 that have been detected and removed by the background modification filter. The resulting update lines 192 generated by the background modification filter are added to the initial background mask creating completed background mask 111. FIG. 14 shows background mask 111 that is applied to completely expanded text mask 172 to generate clean, text-only mask 197 in step 13 of process 300. Text mask 197 still contains both text and high-contrast type 2 objects.

Figure 15:
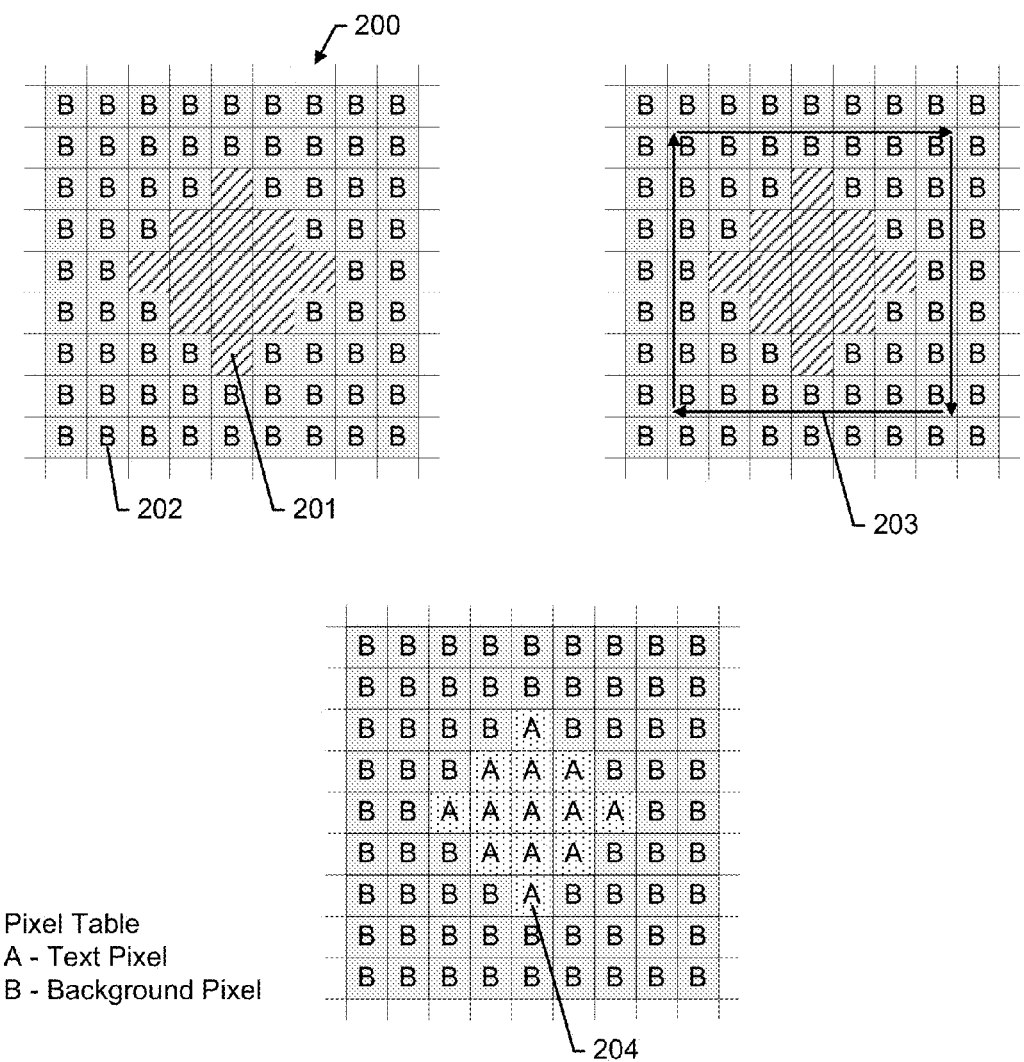
FIG. 15 illustrates a non-text object surrounded by background pixels that is detected as a low-contrast object.

FIG. 15 is an illustration of an enclosed artifact search process enabled to detect small areas that are smooth or have low contrast, for example a low contrast icon overlaid on a background. Step 14 of process 300 add these artifacts as type 1 objects to the text mask so that they can be accurately reproduced. Referring to FIG. 15, an area 201 of image 200 comprises pixels that have not been identified as text or background. Area 201 is surrounded by pixels that are identified as background pixels 202 (each designated 'B'). The process searches for a series of connected background pixels that can create box 203 around the unmarked pixels. If the size of the box is within a defined area, the unmarked pixels are marked as object pixels A 204. If the box exceeds the defined area, it is likely a picture on a page and the pixels are left unmarked. These and other unmarked pixels are classified as picture pixels at the end of the identification sequence. The addition of the enclosed objects to the text mask may improve the results of step 12. For example, in the case of an enclosed object that bisects a horizontal line of one color into two shorter lines, the two lines may be joined by step 12 to form a single line once the enclosed object is removed. The resulting single line is more efficiently compressed.

Figure 16:
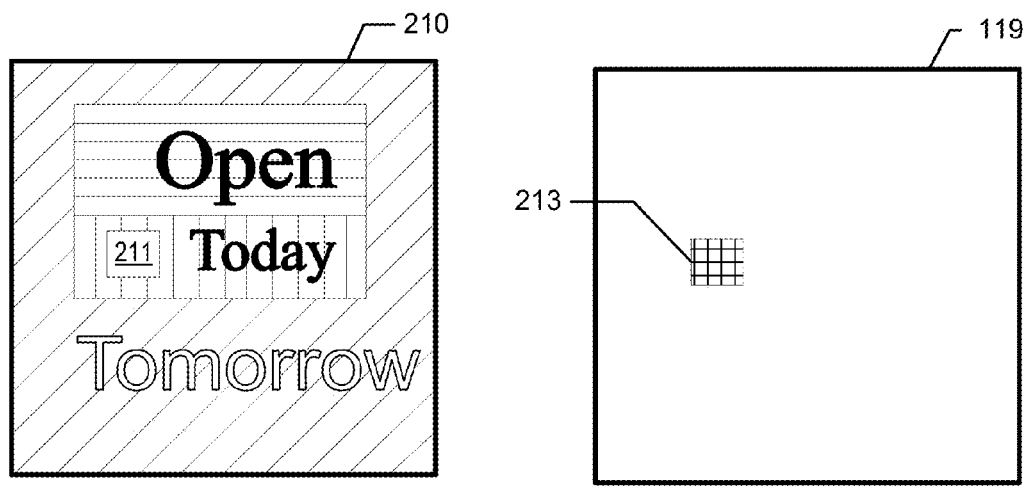
FIG. 16 illustrates the generation of an object mask containing the non-text artifacts.

FIG. 16 illustrates the results of step 15 of process 300 for an image 210 in which unidentified low contrast artifacts are separated from text, and moved to the object mask as type 1 objects. Undefined artifact 211 of image 210 removed and added as object 213 on object mask 119. FIG. 17 illustrates the results of step 16 of process 300 in which a picture mask 115 is generated by identifying the unmarked pixels resultant from the combination of background mask 111 and text mask 197.

Figure 18:
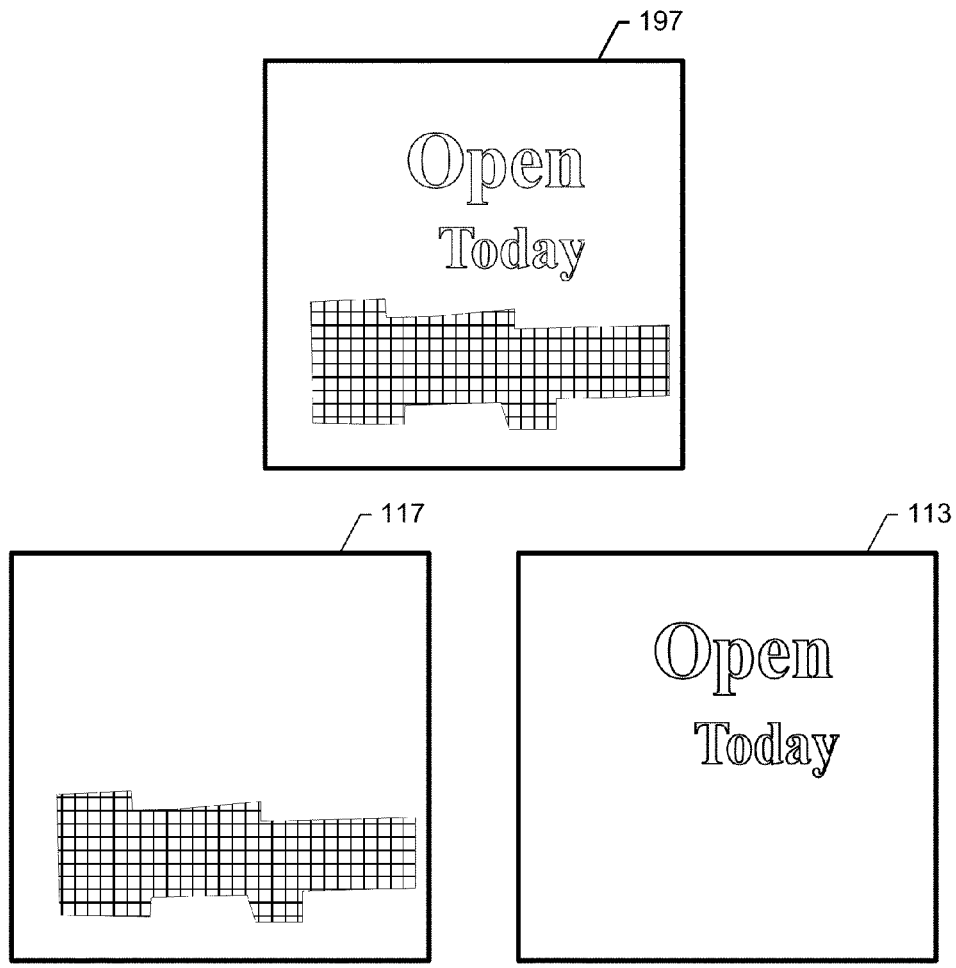
FIG. 18 illustrates the separation of the text mask from the high-contrast object mask based on the different background characteristics of text and high-contrast objects.
Figure 19:
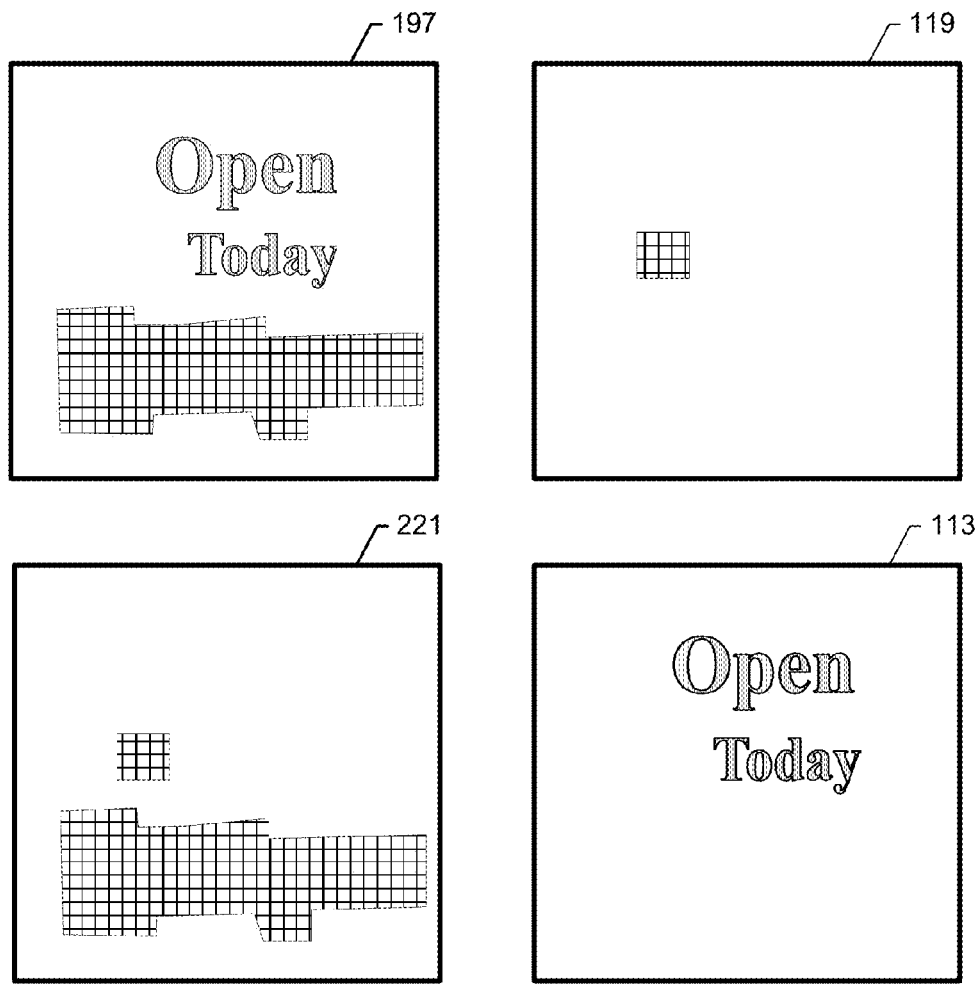
FIG. 19 illustrates a variation on the object mask set that combines the different object types onto a single mask.

FIG. 18 illustrates the results of high-contrast type 2 objects being moved to the object layer. Text pixels that are at least partially surrounded by pictures are removed from text mask 197 and type 2 object mask 117 is generated. Text pixels that are completely surrounded by background pixels remain on text mask 113. FIG. 19 illustrates a variation in which the type 2 objects on text mask 197 are added to object mask 119 (that already contains low-contrast objects detected in the encircling filter) to form combined object mask 221 rather than two separate object masks. Separating the objects into multiple masks provides further compression opportunities.

Small areas of image types may be filtered at step 17 of process 300 once the masks are created. This filter reclassifies small areas of one image type based on the type of adjacent pixels in order to improve the compression ratio of the image. One filter method changes small areas of background pixels that are surrounded by text pixels to text pixels. The reason this is more efficient is that background image types compress well if they define a large area, but the text compression algorithms may be better at handling small groups of pixels. Another filter method changes small groups of background pixels that are surrounded by picture pixels to picture pixels because these areas are likely a flat area of the picture. Yet another filter method converts small groups of picture pixels surrounded by background or text pixels to text pixels using methods similar to the detection method of process 300 stet 14.

The described decomposition method primarily discusses a grayscale image for simplicity purposes. However, various embodiments apply decomposition methods to an RGB computer display image by individually testing each color component using the steps of process 300 described. The text filters used in such color applications may select the number of colors required in order to satisfy the positive text identification criteria. In other embodiments, color space translation is used to improve or simplify the decomposition method. In such case, the image compression process that follows decomposition should generally use either an RGB format or an alternative lossless translation to ensure accurate reproduction of the image.

Figure 20:
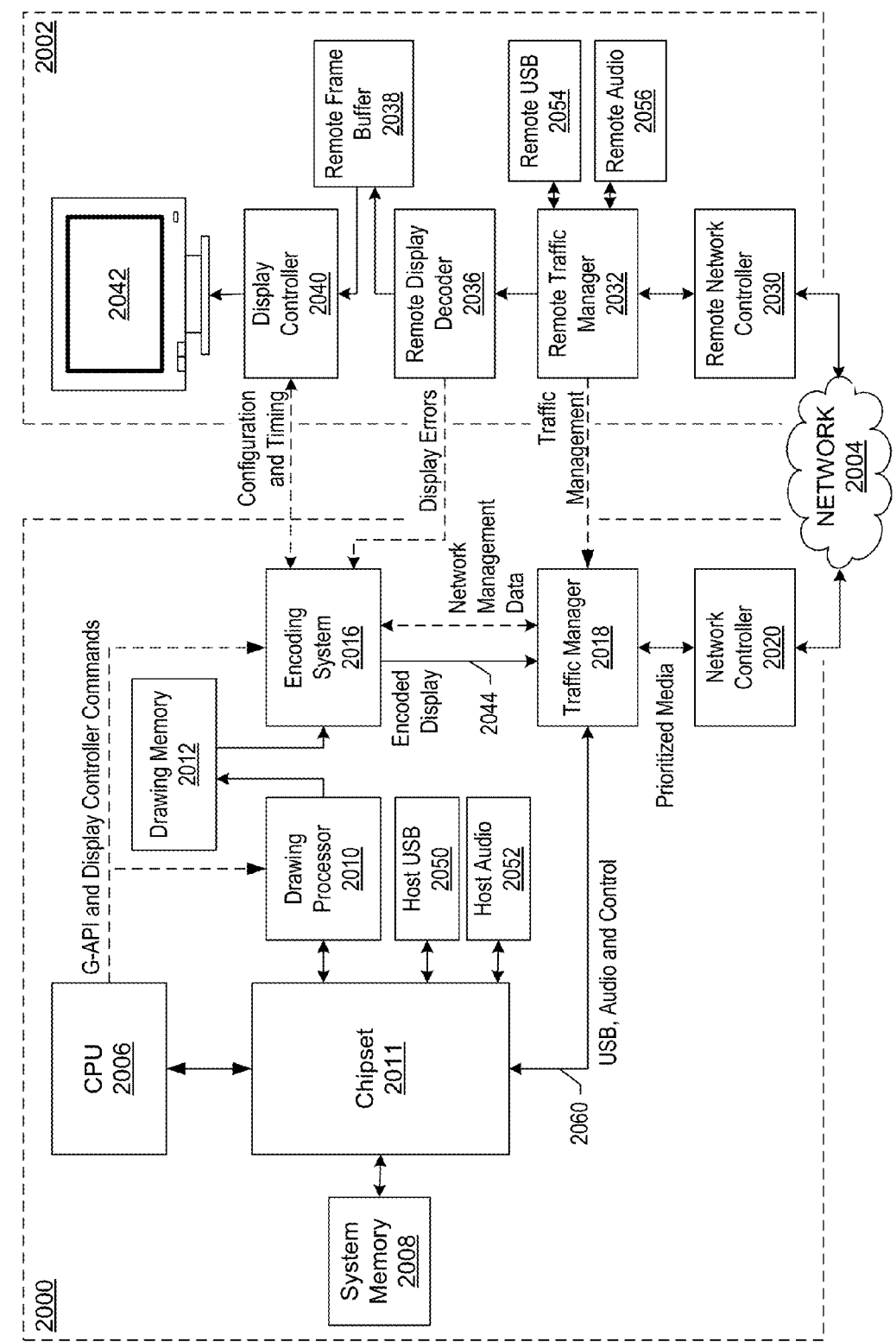
FIG. 20 illustrates a system architecture that enables the aggregation and transmission of display, audio and USB data between a data processing system and a remote user interface.

FIG. 20 illustrates system 2001 in accordance with embodiments of the present invention that enables the aggregation, encoding and transmission of display, audio and USB data between a data processing system and a remote user interface. Display images are rendered to a system memory or a shared drawing memory by a graphic drawing system such as a Graphic Processing Unit (GPU) or GPU emulation software on the data processor before being encoded and aggregated. The encoding system monitors drawing commands issued by the CPU and interprets selective commands that enable the optimization of encoding methods. FIG. 20 provides a system view of an embodiment of the invention.

Referring to FIG. 20, host system 2000 is connected to remote system 2002 by network 2004. Host system 2000 is comprised of CPU 2006 connected to system memory 2008 and drawing processor 2010 by chipset 2011. While a single CPU 2006 is illustrated, it is to be understood that alternative embodiments where multiple CPUs are utilized in a cooperative arrangement can also be realized. In an embodiment, drawing processor 2010 is a discrete silicon component such as a GPU connected to CPU 2006 by a data bus via chipset 2011. In other embodiments, drawing processor 2010 comprises a silicon function integrated into chipset 2011 or CPU 2006. In yet other embodiments such as a virtualized architecture uses in Virtualized Desktop Infrastructure (VDI), system 2001 comprises multiple drawing processors 2010, each implemented at least in part as machine readable instructions that are executed by CPU 2006 (i.e. drawing processor 2010 may be a virtualized GPU). Drawing processor 2010 is coupled to drawing memory 2012 which incorporates one or more frame buffers. In discrete embodiments of drawing processor 2010, drawing memory 2012 is generally high speed memory double data rate (e.g. DDR3) or extreme data rate (XDR) memory dedicated for access by drawing processor 2010 and encoding system 2016. In a virtualized embodiment, drawing memory 2012 comprises one or more regions of system memory 2008. Drawing memory 2012 generally stores information associated with an image representation including image vector or pixel data, attributes, drawing commands, file information or other details pertinent to an image.

In some embodiments, host system 2000 also includes other peripherals, such as host USB controller 2050 and/or host audio controller 2052 connected to CPU 2006 by chipset 201. In an embodiment, host USB controller 2050 is bridged at the buffer management layer with remote USB system 2054 to provide a synchronized data path that enables the communications of different traffic types including control and status packets in addition to packet transport of different USB data types such as isochronous and bulk data types. Host audio controller 2052 is bridged at the buffer management layer with remote audio system 2056 to provide synchronized communications of packetized audio data and audio control information between host and remote systems. In some embodiments, host USB controller 2050 and host audio controller 2052 are implemented, at least in part as software functions executed by CPU 2006 and/or embedded in other host subsystems, including chipset 2011 or encoding system 2016.

In an embodiment, encoding system 2016 is connected to drawing memory 2012 so that it can read and encode sections of the display image in drawing memory 2012. In such an embodiment, encoding system 2016 may have directly addressable access to a drawing memory that is used by drawing processor 2010. In an alternative embodiment, drawing memory 2012 may be part of system memory 2008 connected to CPU 2006 or chipset 2011, and in which case, encoding system 2016 also has access to the drawing memory. In some embodiments, at least part of encoding system 2016 is implemented as machine readable instructions suitable for execution by CPU 2006 or a second processor in communication with drawing memory 2012.

In the embodiment of FIG. 20, encoding system 2016 is connected to traffic manager 2018 for transfer of encoded display data from the encoding system to the traffic manager. Traffic manager 2018 aggregates display data with other CPU or peripheral traffic and forwards it to network controller 2020, which manages the transport of network packets from host system 2000 to remote system 2002. Network controller 2020 also receives media streams such as audio, USB and control messages from remote system 2002 which are forwarded to traffic manager 2018, which in turn passes them to destination host USB controller 2050 or audio controller 2052.

In some embodiments, network controller 2020 and encoding system 2016 are connected to chipset 2011 by a system bus such that encoded display data 2044 and network management data may be communicated between network controller 2020 and encoding system 2016 over the system bus. In such implementations, traffic manager 2018 may not be necessary to the encoding and transmission system.

Drawing operations may be performed using published methods such as existing industry compatible application programming interfaces (APIs) available to existing application software. CPU 2006 issues drawing commands to drawing processor 2010, which renders display images in drawing memory 2012. Encoding system 2016 then accesses image sections from drawing memory 2012 and compresses them using encoding methods described below.

In an embodiment, encoded image sections are forwarded from encoding system 2016 to traffic manager 2018 where they are prioritized and multiplexed with audio, USB and other control signals from CPU 2006 or peripherals that are also destined for the remote system. Traffic manager 2018 prioritizes the outgoing traffic based on the real-time demands of the image, audio and USB media streams and the attributes of the present image to ensure perceptually insignificant delays at remote system 2002. As one example, display update information receives higher priority than bulk USB transfers. As a second example, outbound display updates are multiplexed with outbound audio data updates in situations where a portion of the display has been identified as a video sequence. This ensures that a video sequence remains synchronized with its audio channels. As a third example, each traffic type is allocated a fixed maximum bandwidth. For example, image data may be granted 80% of the network bandwidth while audio and USB data may each be allocated 10% of the available bandwidth. In the case where audio data meets its allocated bandwidth, a higher compression ratio may be activated. In the case of bulk USB data meeting its threshold, the USB data may be delayed until competing higher priority transfers have completed. In the case where image data exceeds its bandwidth, a different image encoding method that requires less bandwidth may be selected and used. Other methods of traffic management such as the real-time allocation to different traffic types according to traffic type and priority may also be used.

Traffic manager 2018 may also feed network availability information back to encoding system 2016 so that suitable encoding methods may be selected based on network conditions. Such network availability information may be determined by monitoring the bandwidth requirements of inbound and outbound USB and audio streams, monitoring error rates and receiving performance information provided by remote system 2002 and optionally real-time network management equipment. In an exemplary embodiment, multiplexed media and control streams are encapsulated using an appropriate network protocol, for example UDP/IP are then forwarded to network controller 2020 for transmission over an Ethernet network 2004. Network controller 2020 then manages the physical and link-layer communication of the data streams to remote network controller 2030 in the remote system 2002.

Remote network controller 2030 manages the physical and link-layer communication of the data streams to and from host network controller 2020. Remote network controller 2030 forwards inbound traffic to remote traffic manager 2032, which reconverts the aggregated streams from host system 2000 into separate audio, USB and image streams. USB data and audio streams are directed to remote USB 2054 and remote audio 2056 systems respectively while display image data is directed to remote display decoder 2036. Remote traffic manager 2032 also directs host-bound traffic from the remote USB and audio systems to remote network controller 2030 for encapsulation and transfer to host system 2000.

The display data received from host system 2000 is decoded by remote display decoder 2036 and stored in remote frame buffer 2038. Alternatively, the image may be stored directly in frame buffer 2038 in compressed form and decoded by remote display decoder 2036 in real-time as controlled by display controller 2040. Display controller 2040 accesses the image from frame buffer 2038 and generates a timed display video signal, e.g. Digital Visual Interface (DVI) signal, which is used to drive remote display 2042.

Network errors and bandwidth availability are managed at various protocol levels by different modules. At the physical and network protocol layers, the transport is managed between network controller 2020 and remote network controller 2030. Remote traffic manager 2032 monitors network congestion and availability based on the timing of received packets, sequence numbers and lost packets and periodically signals traffic manager 2018 regarding network and data transfer status. Traffic manager 2018 forwards this status information to encoding system 2016, which adapts the encoding scheme in real-time based in part on bandwidth availability. Encoding system 2016 may also predict future bandwidth requirements based on interpreted drawing commands as described.

At a higher protocol layer, remote display decoder 2036 detects if image sections are corrupt, late or dropped. In these cases, remote display decoder 2036 signals encoding system 2016 that the section should be retransmitted. Encoding system 2016 either retransmits the requested section or an updated version, depending on the availability of refreshed information in the drawing memory 2012.

Figure 21:
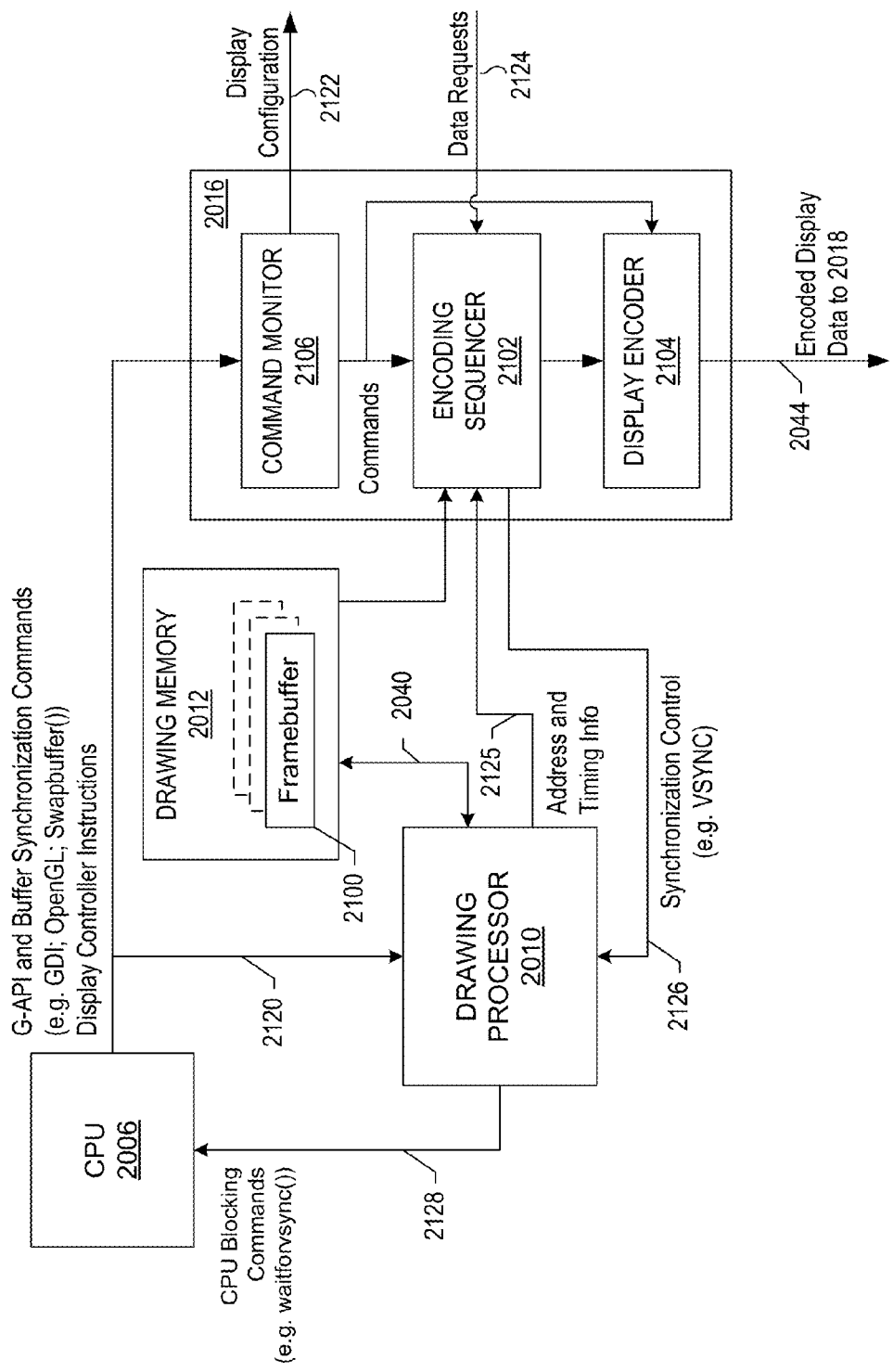
FIG. 21 illustrates the drawing command, image data and timing signal flow between the CPU, drawing processor and the encoding system.

FIG. 21 illustrates the image data, drawing command and timing signal flow between CPU 2006, drawing processor 2010 and encoding system 2016 according to select embodiments. CPU 2006 issues drawing commands to drawing processor 2010, which renders the display image in one or more frame buffers within drawing memory 2012. Encoding system 2016 reads sections of the memory 2012 for encoding. Drawing memory 2012 is connected to drawing processor 2010 by one of several mechanisms such as high-capacity data bus or memory interconnect in cases where drawing functions are software functions executed by CPU 2006.

Drawing memory 2012 incorporates one or more designated areas that are used by drawing processor 2010 to render and store display image frames (ref. frame buffers 2100). The presence of a bus arbiter between the drawing memory and drawing processor 2010/encoding system 2016 enables processor 2010 to draw to drawing memory 2012 in a transparent manner (i.e. as if an encoding system were not also connected to drawing memory 2012). Such an arbitrated coupling enables the rendering performance of the drawing system to not be impacted by the presence of the encoding system 2016.

In an embodiment, encoding system 2016 comprises three modules. First, encoding sequencer 2102 has read access to drawing memory 2012 and responds to requests for updated display sections by reading the requested sections from the drawing memory 2012. Second, display encoder 2104 is connected to the output of encoding sequencer 2102 and compresses sections of the display image using any of several means described below. Third, command monitor 2106 has access to the drawing commands issued by CPU 2006. The command monitor may either be a software function executing on the CPU, and/or a dedicated function or functions embedded within encoding sequencer 2102 and/or display encoder 2104. In select embodiments, the display encoder is a dedicated hardware module but the functionality of encoder 2104 may be implemented either as hardware or software (or a combination) within drawing processor 2010 or CPU 2006 in other embodiments. Encoding sequencer 2102 uses synchronized timing means to access pixels, blocks, lines, frames or other sections of image from a frame buffer 2100 in the drawing memory 2012. This access is initiated by any of several mechanisms, including an incoming request from remote display decoder 2124 or locally generated timing. In select embodiments, regions of a frame buffer 2100 are read on request by remote display decoder 2124 only after drawing processor 2010 has signaled that the rendering of a current frame is complete, for example using frame buffer timing signal 2125. To prevent the tearing of a display image during encoding, it is generally recommended to delay the encoding of a frame until the completion of some raster operations such as "move" operations.

In some embodiments, the drawing command stream rate at which a software application executed by CPU 2006 calls drawing processor 2010 is controlled (e.g. using CPU blocking commands 2128) so that drawing memory 2012 is updated at a rate that matches the image throughput rate. The optimum frame update rate is determined by identifying image throughput bottlenecks. In one embodiment, the bottleneck is identified by comparing the throughput of the drawing, encoding, transmitting and decoding functions and the rate at which drawing command are issued is controlled to match the slowest throughput. In another embodiment, the encoding method is selected so that the transmission rate matches the slowest of the drawing command throughput rate, the encoding rate and the decoding rate. In an embodiment, frame buffer timing signal 2125 is used to establish the frame update rate used by the encoder. In embodiments where network bandwidth is unconstrained, a frame buffer 2100 is read by encoding system 2016 prior to the drawing processor flagging the completion of the rendering operation. In such cases, encoding system 2016 may encode and transmit the image prior to drawing completion. In this embodiment, encoding system 2016 keeps track of sections updated by drawing changes that occur after the selection of a particular frame buffer 2100 and transmits these changed sections after the drawing processor signals the availability of the rendered image. The advantage of this method in systems with a high availability of network bandwidth is that even though some data may be transmitted twice, pre-encoding and pre-transmission of image sections reduces the overall latency between the rendering operations and remote display operations.

Encoding sequencer 2102 reads the requested image segment and forwards it to display encoder 2104 for compression. Encoding sequencer 2102 may also emulate a local display controller 2040 by providing timing signals (e.g. VSYNC signal 2126) for drawing processor 2010. Command monitor 2106 filters drawing commands 2120 issued by CPU 2006 to drawing processor 2010 for useful information that may facilitate or optimize image decomposition and/or display encoding functions. Useful information includes an understanding of image type, co-ordinates, image quality, display priority (i.e. latency) and other attributes of the display. Display encoder 2104 uses knowledge gained from the drawing commands that have been forwarded by command monitor 2106 and additional knowledge of which areas of the frame buffer have been updated to compresses image sections or changed areas of the image sections.

Command monitor 2106 may also monitor source commands executed by CPU 2006 for display setup parameters, configuration instructions and timing requirements including display refresh rates issued to display controller and forwards configuration information 2122 to remote display controller 2040. Timing requirements are forwarded to encoding sequencer 2104 which uses the information to provide emulated timing for the drawing processor (e.g. VSYNC signal 2126). In select cases where a software application is blocked waiting for the completion of drawing operations (e.g. a waitforvsync( ) function call), CPU 2006 is abstracted from the fact that the VSYNC signal is generated by the encoding system rather than the drawing processor. Encoding system 2016 determines the timing of drawing processor 2010 but in the case of a blocking command, the token is returned by the drawing system to CPU 2006 (ref. signal 2128) on command completion. In an embodiment, command monitor 2106 initiates a low power state based on the absence of drawing commands. In an exemplary power saving application, the access circuitry of drawing memory 2012 associated with a particular frame buffer is temporarily disabled if the frame buffer is not updated over a determined period.

Figure 22:
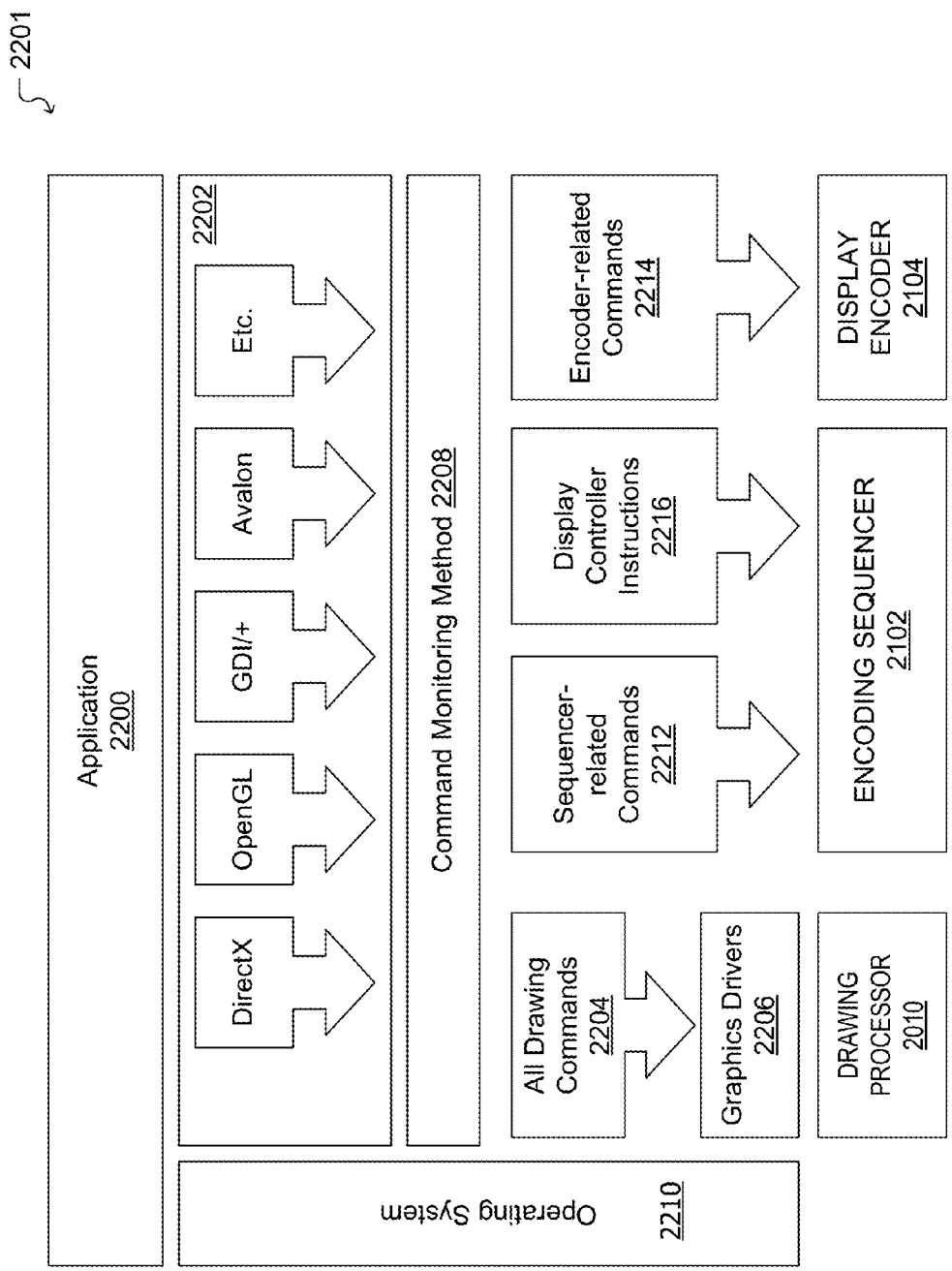
FIG. 22 illustrates a in block diagram form a software architecture on the CPU of a data processor that enables the monitoring and selective filtering of drawing commands issued by the host application for use by the encoding system.

FIG. 22 illustrates CPU software architecture 2201 for host system 2000 that enables the monitoring and selective filtering of drawing commands issued by the host software application for use by the encoding system. Referring to FIG. 22, application 2200 on CPU 2006 uses a variety of application programming interfaces 2202 to issue graphics instructions 2204 to graphics driver 2206, drawing processor 2010 or drawing process, either internal or externally to the CPU. These instructions include various types of graphics drawing instructions from simple and direct pixel placement commands such as BitBlt( ), to sophisticated 3D shading and lighting commands as incorporated in the OpenGL API, or video commands such as those available in Microsoft's DirectShow API that control the properties of video sequences displayed on a computer monitor. Examples of useful drawing commands from various APIs are listed in Tables 1-9.

The image drawn to a frame buffer in the same way as a system without the presence of an encoding system. When a drawing API function is called, a graphic instruction is issued to graphics device driver 2206 that interprets the instruction for the particular hardware implementation of the drawing processor. Some embodiments comprise an additional command monitoring software processing layer 2208 between drawing command API 2202 and graphics driver 2206. The drawing command monitor issues the command to the drawing processor (via the graphics driver) and forwards selective duplicate commands to encoding sequencer 2102 and display encoder 2104.

Command monitor 2106 extracts and forwards essential elements of the drawing commands including sequencer-related commands 2212 which comprise useful hints based on what part of the image is being drawn and encoder-related commands 2214 which describe properties of the image used to influence the selection of encoding method. Command monitor 2106 may also monitor operating system 2210 for system commands and display setup and configuration instructions 2216 destined for the display controller. Configuration instructions are forwarded to the remote display controller 2040 while synchronization instructions that synchronize image updates with the display refresh rate are sent to the encoding sequencer 2102 to enable the appropriate frame buffer to be encoded, transmitted, decoded and displayed at the remote display 2042.

Figure 23:
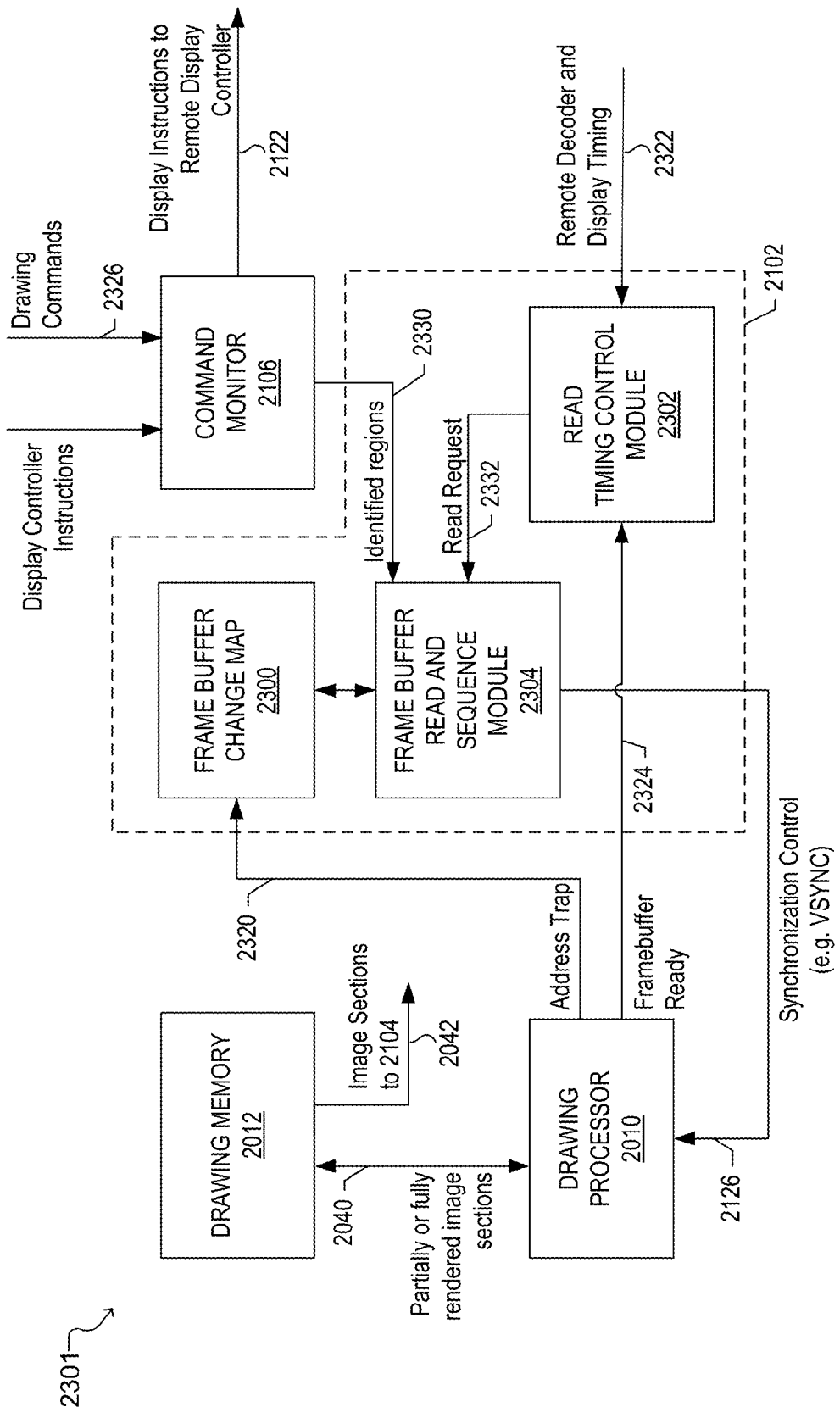
FIG. 23 illustrates an encoding sequencer that replaces the traditional function of the raster-based display controller found in a typical local display environment.

FIG. 23 shows architecture 2301 of encoding sequencer 2102 and connections to various modules and systems that enable encoding sequencer 2102 to replace the traditional function of the raster-based display controller found in a typical local display environment. In an embodiment, encoding sequencer 2102 comprises a frame buffer change map 2300, a read timing control module 2302 and a frame buffer read and sequence module 2304. Frame buffer change map 2300 is a map of bits corresponding to bitmapped frame buffer locations in the drawing memory. When drawing processor 2010 updates a frame buffer, address information is captured (reference numeral 2320) and bits in the map are set to indicate areas or pixels of the frame buffer that have been updated since the last time that the frame buffer was accessed by the encoding sequencer. The bits in the map are cleared before the corresponding areas of the frame buffer have been read. This ensures synchronization and allows the bits to be set again by additional changes before the encoding is complete. Read timing control module 2302 controls the timing of frame buffer accesses. At a system level, the timing is designed to ensure that the encoding function, data transfer and decoding function are completed just ahead of the associated part of the display image being accessed by the remote display controller which minimizes the latency between the time the image is first written to the host frame buffer and the time the image is displayed. To accomplish this, read timing control module 2302 generates a timing rate that is an early copy of the remote display controller timing rate by responding to remote requests for updated display sections 2322. When read timing control module receives a block read request from remote display controller 2040, it signals the frame buffer read and sequence module 2304 that a read operation is due. Frame buffer change map 2300 indicates pixels in the frame buffer that have been updated and these may be read. Read timing control module 2302 also receives frame buffer ready flag 2324 which is asserted by the drawing processor once a frame buffer has been rendered and signals the earliest time that a frame buffer is available for reading. In one embodiment, reading of the frame buffer occurs ahead of the ready signal. In another embodiment, this timing information is provided by drawing commands 2326 such as swapbuffers( ) or flush( ) commands captured by command monitor 2106 and forwarded to encoding sequencer 2102 rather than using hardware signaling between drawing processor 2010 and read timing control module 2302. In another embodiment, read timing control module 2302 makes dynamic timing decisions based on the combination of remote decoder display timing 2322, frame buffer ready flag 2324 and image status information as determined by drawing commands 2326. A local periodic master timer provides an alternative method for controlling the read timing. In such a case, the remote display controller operates asynchronously to the encoding sequencer or as a slave to the timing of encoding system 2016. Frame buffer read and sequence module 2304 reads the frame buffer when instructed by read timing control module 2302. The module reads sections of the frame buffer identified for access based on frame buffer change map 2300 and interpreted drawing commands. For example, the priority of read operations may be influenced by interpreted drawing commands (e.g. a priority request based on an OpenGL priority hint). Other drawing commands such as BitBlt( ) and scrolling functions are also useful to frame buffer read and sequencing module 2304 in determining when some areas of the frame buffer should be read as a priority and which areas should be read so that these updates can occur quickly.

Frame buffer read and sequence module 2304 may also generate synchronization signals 2126 for drawing processor 2010 such as the vertical retrace and blanking signals by using the ability of read timing control module 2302 to synchronize with the timing of the remote display.

Figure 24:
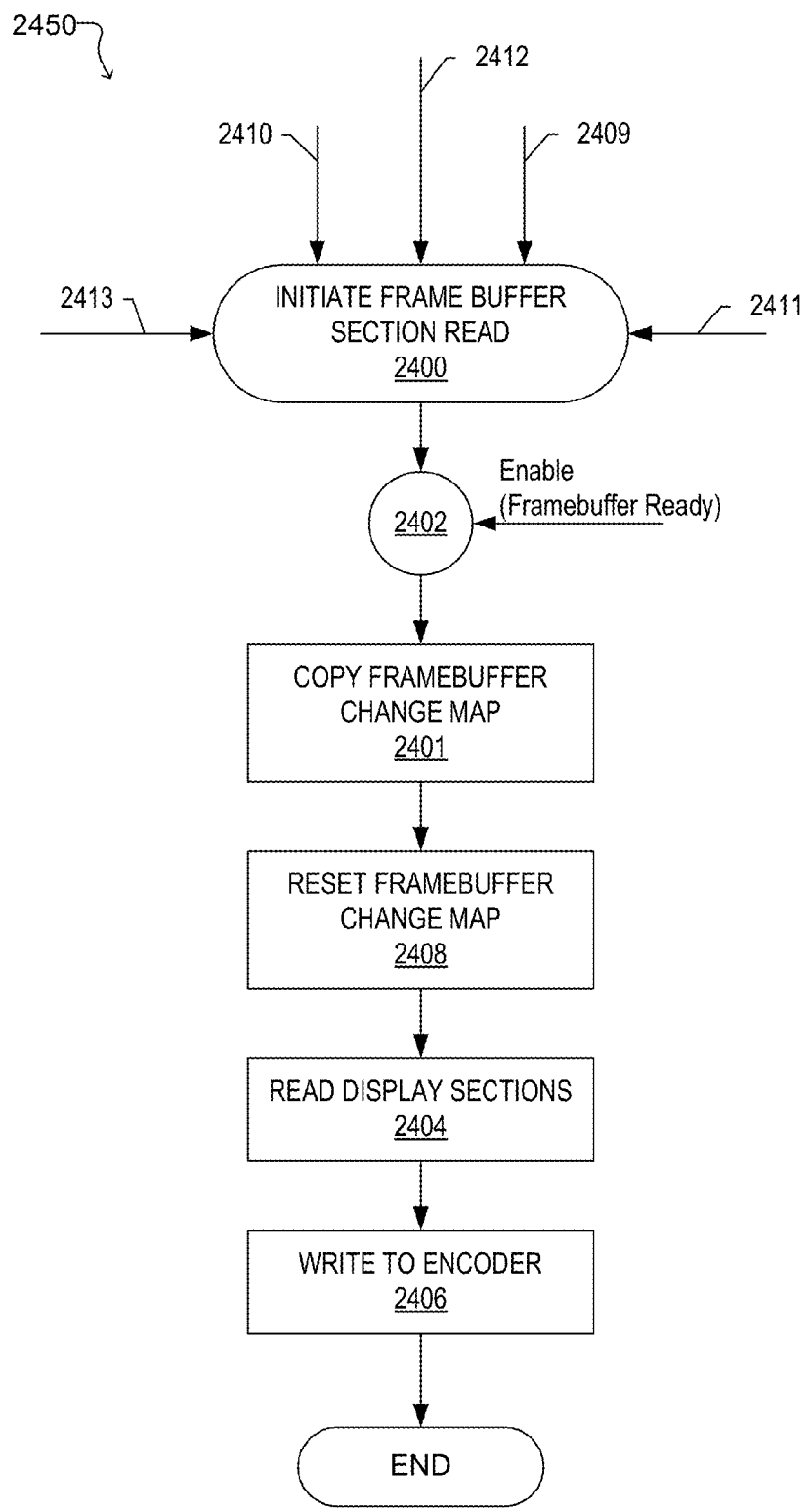
FIG. 24 is a flowchart that illustrates the method used by the encoding sequencer to determine when sections of the frame buffer should be accessed.

FIG. 24 is a flowchart of process 2450 used by the encoding sequencer 2102 to determine when sections of the frame buffer should be accessed for encoding. As a first step 2400 ("Initiate frame buffer section read"), a frame buffer read operation is initiated by any of several mechanisms. A read operation may be initiated by a request from remote display controller (ref. trigger 2409) in the case where the remote display controller is the display timing master. Alternatively, a read operation may be initiated on a periodic refresh request (ref. trigger 2410) such as a request triggered by a local clock or the drawing processor 2010.). Alternatively, initiation may be on request from remote display decoder 2036 in the case where an error has been detected for previous transmission (ref. trigger 2411). Depending on the nature of the error, retransmission may be limited to previously transmitted data, or recently updated parts of the frame buffer may be read and transmitted or the entire frame buffer may be read and transmitted. Additionally, the frame buffer may be read on a frame buffer change map hit (ref. trigger 2412) either on a periodic scan or when the frame buffer is written. Interpreted drawing command hints (ref. hints 2413) may be used to prioritize the sequence of the read function in the case where multiple blocks are available for access.

In some embodiments, process 2450 proceeds to step 2402 in which encoding sequencer access to the frame buffer is delayed until a "frame buffer ready" signal is received. In such embodiments, the frame buffer is made available for reading only following its released by drawing processor 2010. Alternatively, in the case of a host system with a single frame buffer, step 2402 may be bypassed and encoding sequencer 2102 may access the frame buffer asynchronously to rendering functions.

As a next step 2401 ("Copy frame buffer change map"), the frame buffer change map is copied. As a next step 2402 ("Reset frame buffer change map"), the frame buffer change map is reset. As a next step 2404 ("Read display sections"), the sections, pixels, lines, blocks or frames identified in the buffer change map copy are then accessed and assembled with the other information described. As a next step 2406 ("Write to encoder"), the display sections and other information is forwarded to the display encoder.

Figure 25:
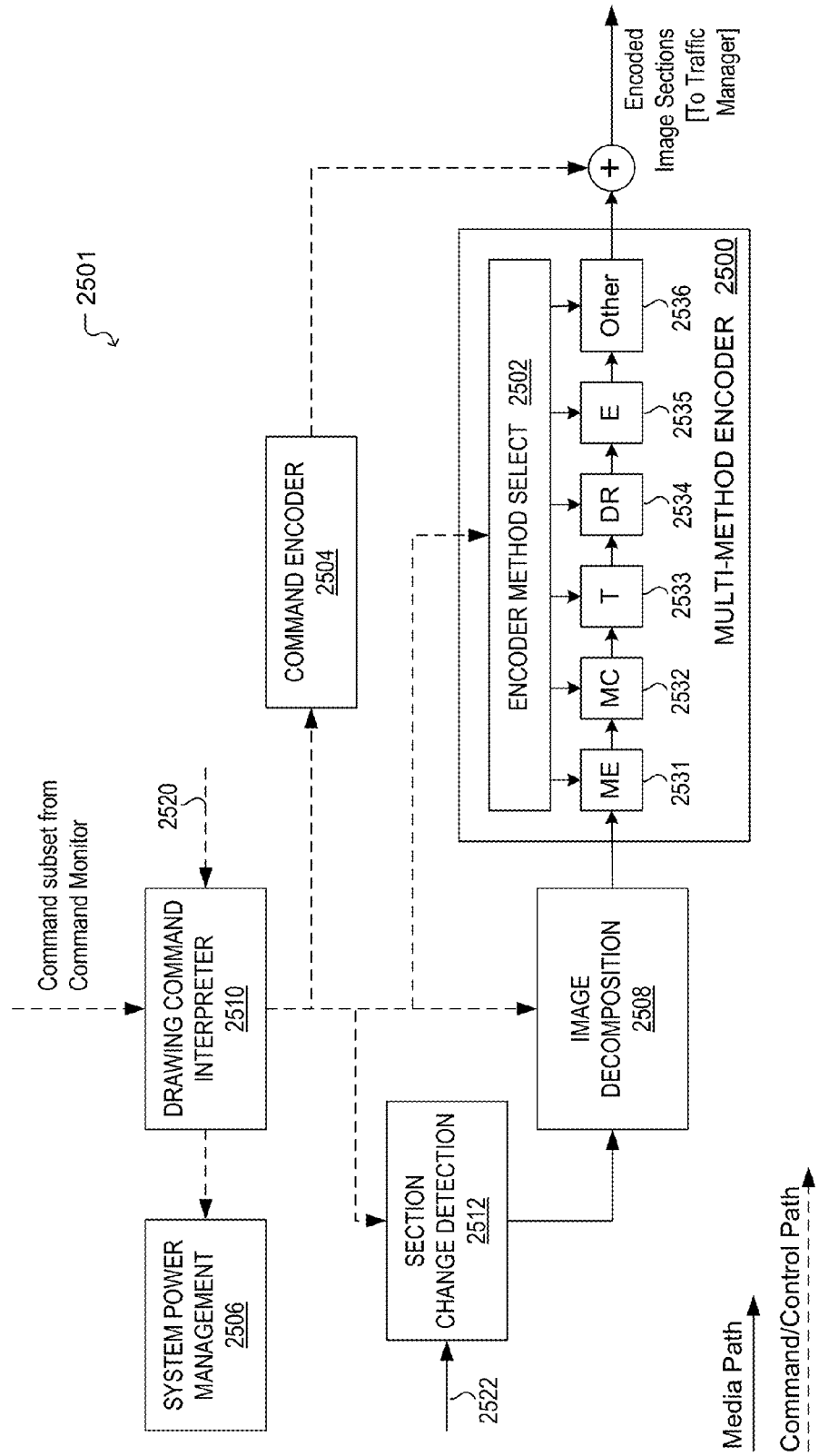
FIG. 25 illustrates the internal architecture of the display encoder that decomposes and compresses the display sections based on drawing commands interpreted from the command monitor.

FIG. 25 illustrates an internal architecture 2501 of display encoder 2624 which comprises several modules enabled to decompose and compresses the display sections based on drawing commands interpreted from the command monitor. Multi-method encoder 2500 includes an enhanced image encoding pipeline, including motion estimation (ME) 2531, motion compensation (MC) 2532, discrete cosine transform DCT and/or discrete wavelet transform DWT stage (T) 2533, data reordering stage (DR) 2534, entropy (E) 2535 encoding stage and optionally other stages 2536. The data reordering stage includes lossless data reordering operations e.g. color cache, LZW, run length coding, mask or data predictors, etc. The entropy encoding stage uses suitable encoders like arithmetic, Golumb or Huffman coders. The stages are controlled by encoder method selector 2502 that selects encoding combinations to support different image content including lossy methods for natural images or lossless methods computer generated text or graphic images. The encoder may also be tunable to different variations in image content such as color depth. Architecture 2501 includes command encoder 2504 used to transfer select display commands to the remote system 2002 rather than processing them locally. One example is a pointer or sprite overlay, which may be implemented using the remote display controller 2040. As a second example, encoding system 2016 may encode one or more pre-defined sub-regions of drawing memory 2012 as determined by interpretation of drawing commands. The sub-regions are transmitted to remote system 2002 with a subset of drawing commands. In such an embodiment, remote system 2002 determines display arrangement details such as window overlay requirements and ordering. In a variation on such an embodiment, predefined sub-regions of drawing memory 2012 from different host systems 2000 are transferred to remote system 2002. Remote system 2002 then determines the composition of display windows from the different host sources.

System power management module 2506 is enabled to reduce the power consumed by elements of encoding system 2016, for example by shutting down elements of the multi-method encoder based on frame buffer change activity and the selected encoding method. In one embodiment, motion estimation circuit 2531 is disabled when there is no motion. Examples of useful drawing commands associated with the reduction of power consumption are shown in TABLE 9.

Image decomposition module 2508 is enabled to classify the image type as a precursor to the encoding operation. In an embodiment, the image is classified into different image types such as background, text, picture or object layers based on a combination of spatial features detected using multilayer image decomposition method 300, temporal features (such as periodic image change rate useful in detection of video image type) and drawing commands interpreted by command interpreter 2510. A selective list of drawing commands that identify image types are listed in Table 2. The various masked layers as classified by module 2508 are subjected to different encoding methods that may include application of lossless encoders for text, background and object image types, application of lossy encoders to picture and video image types and context selection and application of different entropy encoders.

In an embodiment, various multilayer masks generated by the image decomposition process (i.e. process 300) are encoded using a lossless encoding technique supported by encoder 2500 and multiplexed with encoded image payloads prior to transmission to remote system 2002. In an embodiment, four masks M1, M2, M3 and M4 associated with text, background, picture and object image types are multiplexed with data comprising encoded 16×16 pixel blocks in a packet stream with a frame header as shown.

|etc.|--------116×16   data--------|M4|M3|M2|M1|16×16 data--------|M4|M3|M2|M1|--------16×16   data--------|M4|M3|M2|M1|FRAME HEADER Each sequence of mask M1-M4 information fields describes a compressed block area of 16×16 pixels. The compressed image and masks are transmitted to the remote system 2002 as a data stream. In alternative embodiments, the blocks may comprise other dimensions, including larger blocks, lines or entire frames.

Generally, remote display decoder 2036 is enabled to interpret the received data stream and extract the mask information from the mask information fields and decodes the image based on this information to reconstruct the original image frame. Remote display decoder 2036 maintains decoder algorithms complementary to the various elements of encoder 2500 such as is necessary to decompress the image data using the methods identified by the mask information. Depending on the compression method used, the compressed display stream may be decompressed on a per block basis, across multiple blocks (e.g. LZW, JPEG), or across frame updates (e.g. MPEG). In some embodiments, background and picture layers are decompressed and reconstructed before the text and object layers. In the case of the background mask, the mask provides the co-ordinates for the start and end co-ordinates of graphic descriptors or the predictive background decoder. Alternatively, the descriptors themselves may define the background co-ordinates. In some embodiments, the remote display decoder 2036 uses the received picture mask to identify the co-ordinates and boundaries of the picture areas once they have been decompressed. The object mask identifies the exact location of object pixels in the original image although the mask does not specify the object texture. Objects are decompressed and the pixels are populated over the background of the reconstructed image using the co-ordinate positions provided by the mask.

In the case of anti-aliased text, the text mask defines the boundaries of the text. Texture detail is derived through a lossless decoding method used for the text layer text. In the case of simple, fine text, the text mask provides an accurate specification of the form and texture of the text. For example, in the case of simple single color text, accurate text reconstruction is accomplished by populating the locations of the image specified by the text mask with the pixels matching the color specified by the text layer.

Drawing command interpreter 2510 interprets drawing commands identified to enhance the image decomposition process. In one embodiment, a drawing command identifies a section of the display as a video sequence which allows the decomposition function to classify the defined region as a picture or natural image region, independent of the contrast features of the region. If the video sequence displays text, it may be desirable to classify the text overlay as either picture or text dependent on other attributes of the video sequence. This enhanced classification is used to optimize the trade-off between image quality and network bandwidth limitations.

In another embodiment, a video sequence is identified by drawing commands. Drawing command information relating to the video such as blocking information, motion vectors and quantization levels are captured and used to select the blocking information, motion vectors and quantization levels of the encoding method. If the parameters are well matched, the image may be encoded at a quality level and bandwidth comparable to the original video sequence.

In another embodiment, drawing commands enhance the decomposition process by identifying font copy commands that indicate the presence of text, fill commands are identified to indicate the presence of background and texture-related commands are identified to indicate textured regions.

In another embodiment, drawing command hints identify the status of changes to image areas so that an encoding method may be selected based at least in part on change status information. In such an embodiment, information extracted from a drawing command is passed to section change detection module 2512 regarding areas of the inbound image sections from encoding sequencer 2522 that have changed and therefore require encoding and transmission. Block change, pixel change and motion vector commands all provide status information used to identify status changes.

In another embodiment, drawing command hints improve the efficiency of encoding by providing target quality predictions If incorrect predictions are made based on the hints, the image is encoded and transmitted using a higher bandwidth than predicted, but without sacrificing quality.

In another embodiment, the encoding sequence is prioritized to improve the encoding quality based on drawing command hints. As listed in Tables 3 and 8 below, OpenGL drawing commands provide quality and performance hints which provides insight into the quality and performance intended by the application and the encoding method may be set accordingly.

In an embodiment, encoder method selector 2502 selects an appropriate encoding method based on various established criteria. Compression is based on the type of image. Drawing commands may be interpreted to understand attributes of the different sections of the display (based on interpreted drawing commands), where sections may have regular or arbitrary pixel boundary shapes. The commands may be used to identify areas as background, text, photographs, video etc. Each region may then be encoded using an optimum encoding method.

Compression is also based on network availability as indicated by traffic manager 2018. Traffic manager 2018 determines network bandwidth based on availability information from remote traffic manager 2032 and feeds this back to encoding system 2520. Drawing command interpreter 2510 then determines the most effective encoding process based on the combination of the current encoding process, quality requirements, how much of the image is changing as indicated by drawing commands and the available network bandwidth as indicated by traffic manager information. For example, in an embodiment in which a set portion of available bandwidth is allocated to peripheral data traffic and the remaining available bandwidth is granted to image data traffic, the image encoding method is changed when the image data is predicted or measured to exceed its allocated bandwidth.

Based on the desired quality level and the network availability, for example as indicated by traffic manager 2018, suitable encoding methods are selected. For each image type (e.g. picture, video, text, etc.), a lookup table may be used either to determine the bandwidth required (in bits/sec) to achieve a given quality or the quality (in bits/pixel) achievable for a unit of image area using a given bandwidth. In cases where bandwidth is limited due to low network availability or frequent screen changes over a large area, a higher compression mode may be selected or progressive build sequence may be used. In the case of progressive encoding, a relatively low network bandwidth is used to transfer a baseline image or image section of perceptually acceptable quality over a short period of time. Assuming the image or section does not change, more detail is added to the original baseline over time using small amounts of network bandwidth until the image reaches a perceptually lossless quality level. Progressive encoding methods are typically applied at different times and different rates to different sections of an image dependent on quality requirements and the nature of section changes. As a result, at any given time the different sections of an image will be at different progressive encoding states.

In the case of an actively changing image, knowledge of the area of the image that must be updated and an indication of the type of image provides significant information on how much data will be generated when the changing image is encoded. This information may be used in context with information from the traffic manager to modify the encoder method selection. As one example, a low bandwidth encoding method such as lossy encoding may be applied to the changing image in the case of low network availability. As a second example, a higher bandwidth encoding method may be applied to the changing image in the case of high network availability.

In an architecture that shares processing resources between drawing and compression functions (for example a CPU architecture with a single graphic processing unit or drawing processor used for both compression and drawing functions), the processing resource is actively balanced between updating the image (e.g. rendering activities) and updating the remote display (e.g. compression activities). The processing load is balanced in such a way as to equalize all processing-based and transmission-based bottlenecks at a minimum level across the data path.

One example is the case where the frame buffer update rate is higher than the frame transfer rate. In this case, the frame buffer update rate may be decreased to balance the compression transfer rate. If the same resources are used, lowering the frame buffer update rate may have the desirable effect of increasing the frame transfer rate. A second example is the case where the frame buffer update rate is lower than the frame transfer rate. In this case the transfer rate may be lowered to balance the frame buffer update rate. Similarly, if the same resources are used, lowering the transfer rate may increase the frame update rate with an overall effect of improving the new frame rate.

Figure 26:
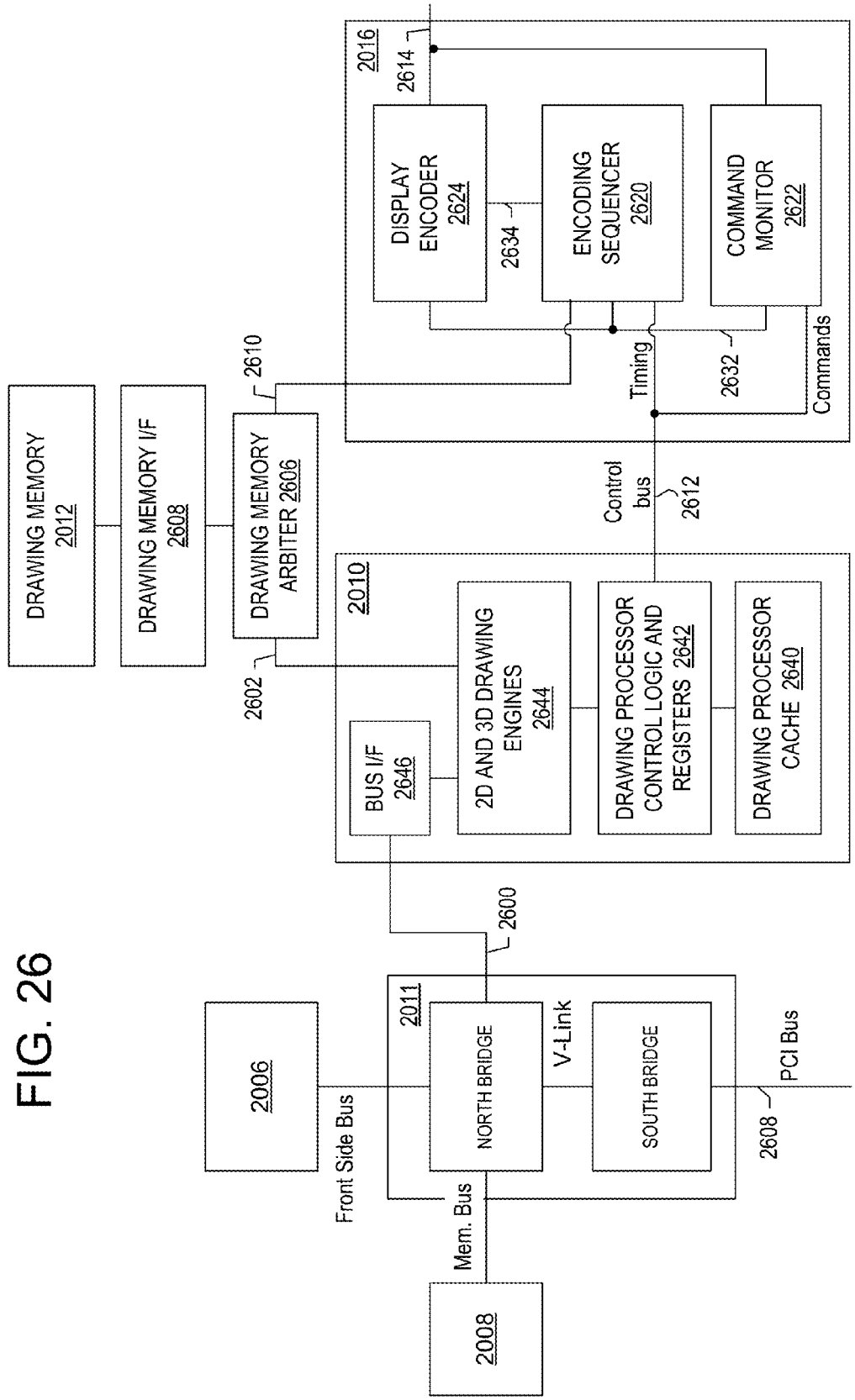
FIG. 26 illustrates in block diagram of a drawing processor and display encoding system with access to a shared drawing memory.

FIG. 26 shows a encoding system 2016 connected to drawing processor 2010, drawing memory 2012 and CPU 2006 via chipset 2011. Encoding system 2016 may be a hardware circuit implementation, a set of software modules or a combination of hardware and software functions in different embodiments. In a select hardware embodiment, encoding sequencer 2620 is a circuit implementation of encoding sequencer 2102, command monitor 2622 is a circuit implementation of command monitor 2106 and display encoder 2624 is a circuit implementation of display encoder 2104.

In such an embodiment, drawing processor 2010 is connected to chipset 2011 by a high capacity bus 2600 such as a PCI-Express bus, an AGP bus or alternative interconnect suited to graphic data transfer. In alternative embodiments, drawing processor 2010 may be integrated with chipset 2011 or CPU 2006. Drawing processor 2010 uses image bus 2602 to write rendered images into drawing memory 2012. As encoding sequencer 2620 also accesses drawing memory 2012, access between the competing resources is arbitrated by drawing memory arbiter 2610.

The arbitration sub-system generally grants encoding system 2016 memory access according to strict encoding timing requirements while simultaneously accommodating the variable requirements of drawing processor 2010. In an embodiment, arbitration between the two resources is achieved by granting drawing processor 2010 a fixed priority and granting encoding system 2016 a low priority. Encoding system 2016 monitors the actual encoding rate in comparison with the desired encoding rate, as determined by the frame update rate. If the encoding system exceeds a time lag threshold, it signals drawing memory arbiter 2606 to change its priority. In another embodiment, drawing memory arbiter 2606 increases memory burst sizes when encoding system 2016 is granted higher priority. Once encoding system 2016 exceeds a lead time threshold, it is once again granted a low priority and burst size is reduced. As a result, encoding system 2016 maintains a desirable memory access priority without impeding drawing processor 2010.

Drawing processor 2010 comprises control bus 2612, with timing signals such as synchronization and control signal 2126 and frame buffer ready signal 2324 previously described connected to encoding sequencer 2620. It also carries drawing commands 2326 and display controller instructions captured by command monitoring method 2208 destined for command monitor 2622. As previously described, these commands typically originate from CPU 2006. Drawing processor 2010 receives the commands across data bus 2600 and forwards them to command monitor 2622. In an alternative embodiment, drawing commands are stored in drawing memory 2012 and are directly accessible by command monitor 2622.

Any of several methods may be deployed to lower the memory bandwidth requirements between encoding system 2016 and drawing memory 2012. One method deploys frame buffer change map 2300 to ensure fewer memory read operations. Frame buffer change map 2300 indicates which memory areas have been updated so that memory areas that have not changed need not be re-read. Another method deploys command monitor 2106 to interpret drawing commands which provides an indication of the type of image in a given area and how it is changing. Frame buffer read and sequence module 2304 may then limit memory access based on status information. As one example, a rapid changing video sequence may be read at a reduced frame rate. Another method for reducing memory bandwidth takes advantage of drawing processor cache memory 2640. While the embodiment of FIG. 26 generally reads image sections from drawing memory 2012 this may not be ideal once image sections have been updated. For example, in applications such as video sequences that occupy a large display area, the rendering function demands a high proportion of the available bandwidth of image bus 2602. In such applications, it may be desirable to reduce the competing bandwidth requirements of encoding system 2016. One method achieves bandwidth reduction by providing encoding system 2016 with access to drawing processor cache memory 2640. In such an embodiment, image sections are encoded directly from drawing processor cache memory 2640 rather than external drawing memory which reduces maximum bandwidth requirements of memory interface 2626.

Figure 27:
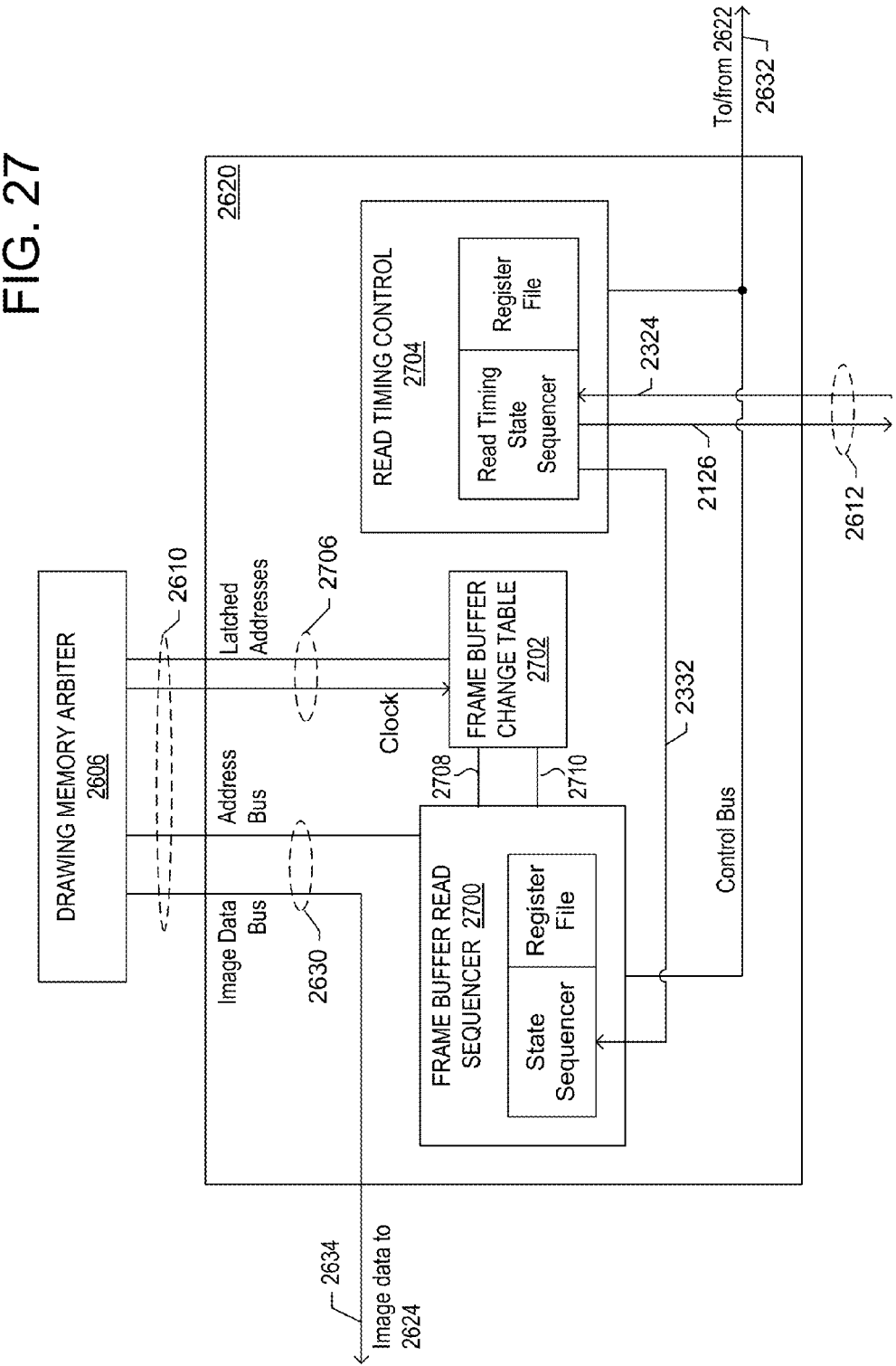
FIG. 27 illustrates in block diagram of an encoding sequencer connected to a drawing memory arbiter.

FIG. 27 shows encoding sequencer 2620 in which frame buffer read sequencer 2700 is an implementation of frame buffer read and sequence module 2304, frame buffer change table 2702 is an implementation of frame buffer change map 2300 and read timing control 2704 is an implementation of read timing control module 2302. When drawing processor 2010 (illustrated in FIG. 26) updates areas of drawing memory, frame buffer change table 2702 latches the accessed addresses across bus 2706 and stores them in a single bit table. In an embodiment where multiple displays are configured, a configuration bitmap is allocated for each remote display. The configuration bitmap enables encoding system 2016 to explicitly track information regarding which of the multiple displays have received which update information. Such bitmap support for tracking updates to multiple displays enables implementation of equitable bandwidth sharing methods, encoder resource sharing methods and transmission prioritization based on image content attributes.

Command monitor 2622 uses control bus 2632 to write the description of identified image regions (previously described 2330) to the register file of frame buffer read sequencer 2700. On read request command 2332 from read timing control 2704, frame buffer read sequencer 2700 accesses frame buffer change table 2702 from bus 2708 to determine which sections of the image have changed. Frame buffer read sequencer 2700 reads the relevant sections of drawing memory 2012 (on FIG. 26) using image bus 2610 and resets frame buffer change map using reset signal 2710. In an embodiment where multiple displays are supported, only the bitmap relating to the current display need be reset. Image data is read directly into display encoder across image bus 2634.

Read timing control 2704 implements a state sequencer to generate timing control signal 2126 for drawing processor 2010 and read timing signal 2332. Timing requirements are derived from remote decoder timing requests written across control bus 2632 to the register file of read timing control 2704 (ref. 2322 in FIG. 23) as well as frame buffer ready signal 2324 in the case of an embodiment with multiple frame buffers.

Figure 28:
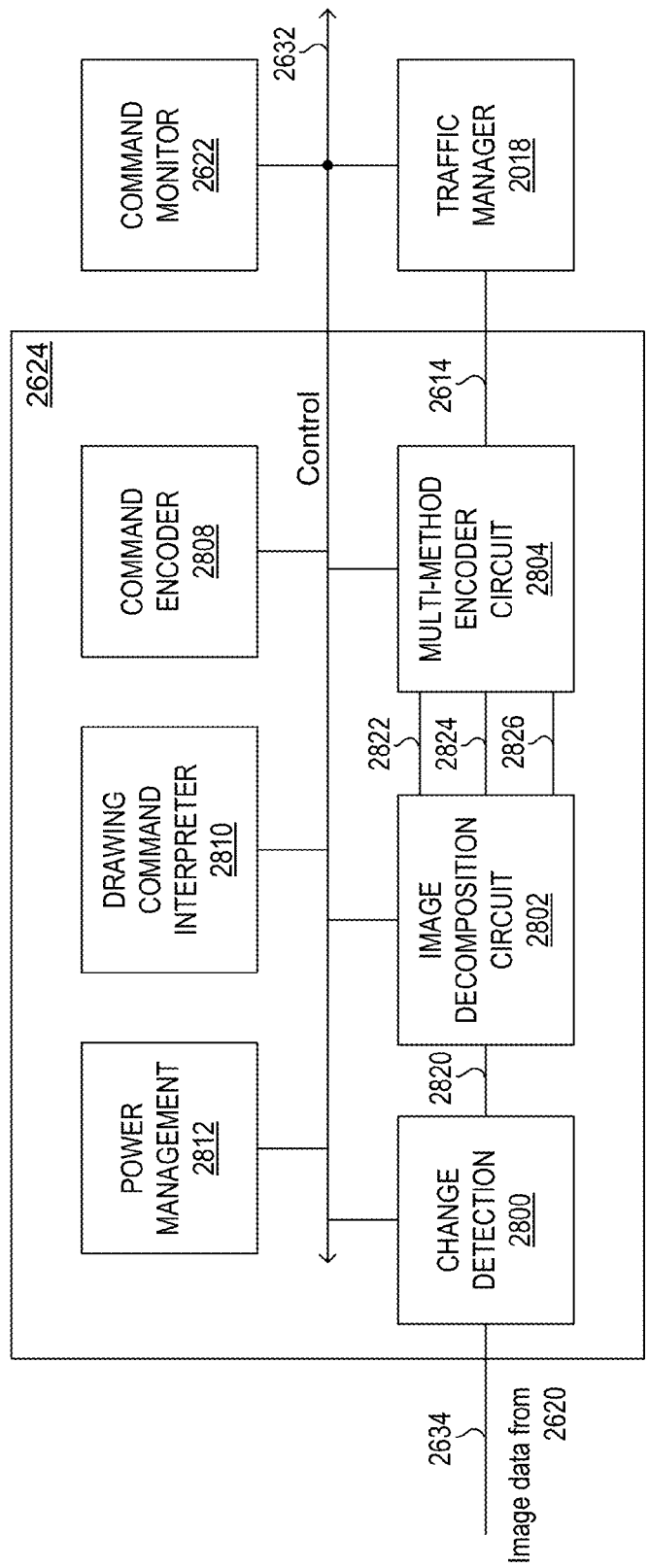
FIG. 28 illustrates in block diagram of a display encoder that encodes selected image areas.

FIG. 28 shows display encoder 2624 comprising section change detection module 2800 which is an implementation of section change detection module 2512, image decomposition circuit 2802 is an implementation of image decomposition module 2508, multi-method encoder circuit 2804 is an implementation of multi-method encoder 2500, command encoder 2808 is an implementation of command encoder 2504 and drawing command interpreter 2810 is an of drawing command interpreter 2510. Incoming commands from command monitor 2622 are interpreted by drawing command interpreter 2810 and distributed across control bus 2632 to system power management module 2812, section change detection module 2800, image decomposition circuit 2802, multi-method encoder 2804 and command encoder 2808. Drawing command interpreter 2810 also receives network availability information (ref. 2520 in FIG. 25) from traffic manager 2018 across control bus 2632. In an embodiment, change detection module 2800 reads updated image sections across data bus 2634 when the relevant sections are addressed by encoding sequencer 2620. Changed image sections 2820 as identified by change detection module 2800 are processed by image decomposition circuit 2802 which, in an embodiment generates a multi-layer mask comprising identified text type pixels 2822, identified background type pixels 2824 and identified picture type pixels 2826. The decomposed image is encoded by a multi-method encoder 2804 using encoding methods described in association with FIG. 25. Encoded image data and encoded masks are then forwarded to traffic manager 2018 across data bus 2614.

Figure 29:
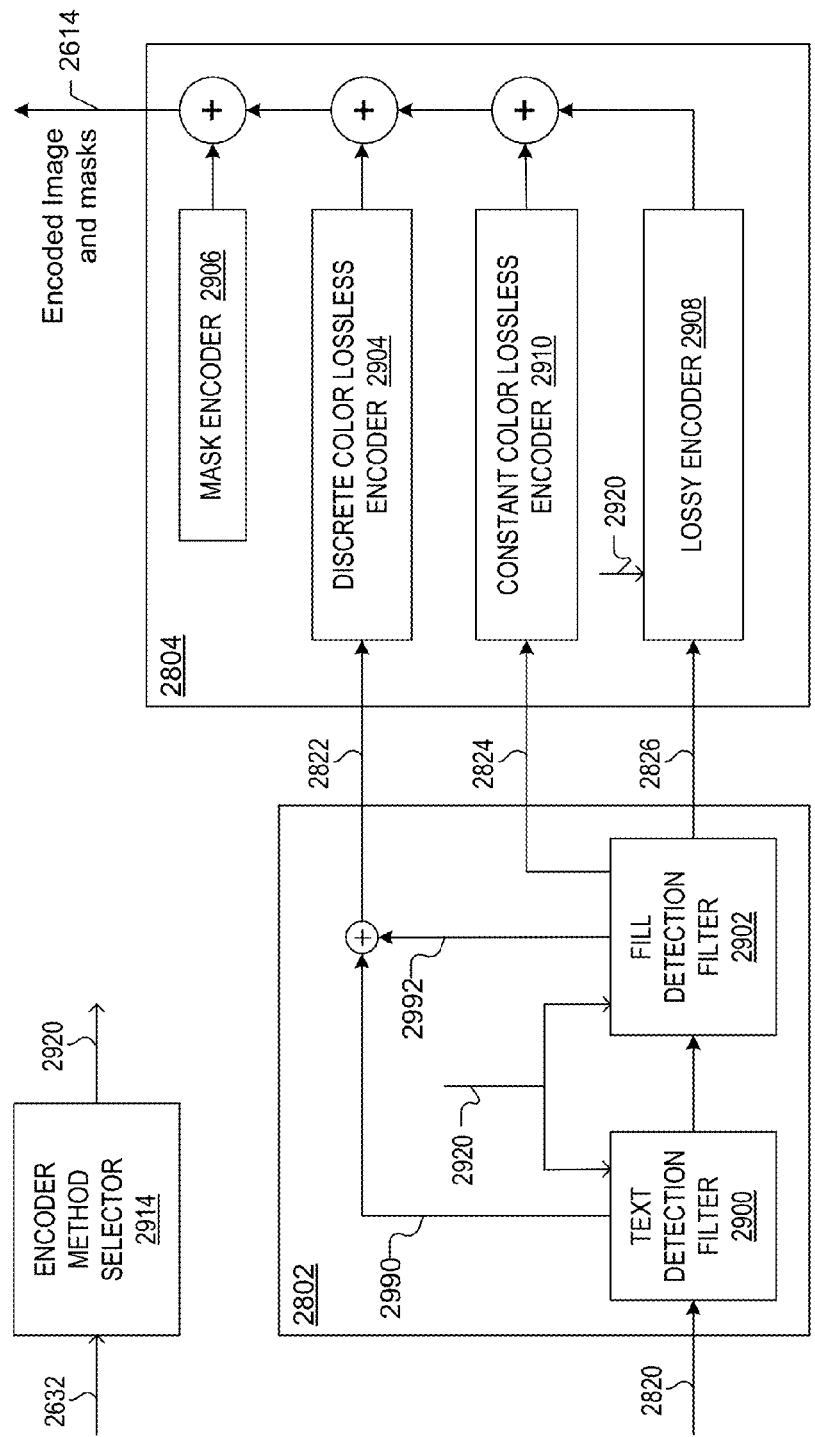
FIG. 29 illustrates in block diagram of image decomposition and multi-method encoders.

FIG. 29 shows logical coupled elements 2901 associated with image decomposition circuit 2802 and multi-method encoder 2804. Image blocks are read by decomposition circuit 2802 on bus 2820 and passed through text detection filter 2900. In an embodiment, text detection filter 2900 includes 3-pixel, 4-pixel and 5-pixel pattern detection elements supported by process 300. The pattern detection elements determine text candidate pixels. Those such candidates exceeding a threshold number of contrast detections are identified as text pixels 2990 in a binary mask associated with the image. Text pixels 2990 are suitable for encoding by a discrete color lossless encoder 2904.

In various embodiments supported by process 300, the image is processed by fill detection filter 2902 which identifies regions of identical color as background regions (i.e., 'fill' regions). In one such embodiment, fill detection filter 2902 identifies contiguous pixels of constant color exceeding a threshold (e.g., a threshold number of pixels) which are designated as background pixels 2824 in a binary mask associated with the image. Background pixels 2824 are suited to lossless encoding by constant color lossless encoder 2910. Fill detection filter 2902 also detects additional text pixels 2992 which include additional pixels within a threshold distance of the identified contiguous pixels of constant color separated by a selection of text candidate pixels. Additional text pixels 2992 also include text candidate pixels surrounded by background pixels and non-background pixels. Select pixels not identified as background but within a threshold distance of one of these additional text pixels are also added to the additional text pixels 2992. In an embodiment, pixels identified as neither text nor background are designated as picture type pixels 2826 in a binary mask. Picture type pixels 2826 are suited to lossy encoding by lossy discrete transform encoder 2908 (also referred to as lossy encoder 2908).

Discrete color lossless encoder 2904 comprises an encoder circuit such as a masked color cache encoder or a masked dictionary encoder enabled to encode text pixel areas of the image designated by the text mask. Constant color lossless encoder 2910 comprises an encoder circuit such as a lossless run length encoder, or a predictive encoder enabled to encode background or fill pixel areas of the image designated by the background mask. In some embodiments, constant color lossless encoder 2910 identifies select pixels (previously identified as text pixels 2822) as "don't care" pixels which are encoded as background pixels for encoding efficiency purposes. Lossy encoder 2908 comprises an encoder such as a DCT or wavelet encoder enabled to encode picture type pixel areas of the image designated by the picture mask (i.e. lossy encoder 2908 may comprise a masked discrete wavelet transform encoder or a masked discrete cosine transform encoder in different embodiments). Mask encoder 2906 is enabled to encode positional information of the identified text pixels 2822, background pixels 2824 and picture type pixels 2826. In an embodiment, mask encoder 2906 is an entropy encoder such as a predictive encoder or a context adaptive binary arithmetic encoder (CABAC) enabled to encode each of the binary mask layers.

The encoded lossy and lossless data sets, in addition to encoded masks from mask encoder 2906 are multiplexed on encoded image bus 2614 and forwarded to traffic manager 2018.

While the set of coupled elements 2901 illustrates the logical data path for text, background and picture pixel types, a physical embodiment of image decomposition circuit 2802 coupled to multi-method encoder 2804 generally comprises a shared memory region (not shown in FIG. 29) that stores a set of masks (or a multi-layer mask) and associated image pixels. The various processing modules or circuits (i.e. "masked encoders") evaluate relevant mask layers to determine which sections of the image should be accessed and processed. For example, discrete color lossless encoder 2904 evaluates (i.e. scans) the text mask to identify regions of the image suitable for text encoding prior to retrieving text image sections for lossless encoding, constant color lossless encoder 2910 evaluates the background mask prior to retrieving background image sections for lossless encoding, and lossy encoder 2908 evaluates a picture mask prior to retrieving candidate picture image sections for lossy encoding.

In some embodiments, multi-method encoder 2804 also uses drawing command hints and/or decomposition hints generated from copy( ), fill( ) and BitBlt commands received from CPU 2006 by command monitor 2106 to improve encoding. As one example, select pixels identified by the fill ( ) command are designated as background pixels. As another example, select pixels defined by a BitBlt command define the boundaries for a consistent pixel type (e.g. the boundary of a background pixel type ending part way into a 16×16 pixel block. By concatenating adjacent pixel boundaries as defined by contiguous BitBlt operations, larger areas of an identified pixel type may be established. As one example, a larger section of picture type may be identified by contiguous BitBlt operations. As another example, a section of background pixels combined with a section of text pixels may be identified by a series of contiguous BitBlt operations. A periodically timed BitBlt operation over a region may be an indication of video image type. In some embodiments, pixel type is determined by weighting decomposition hints for a region against the results of the pixel filters for the region (e.g. weighted against the number of positive contrast filter hits for a region of candidate text pixels to determine if the region should be designated as text or picture type). The boundary specified for commands such as copy( ) commands can be used to prevent small areas of low gradient images (e.g. pale blue sky) from being detected as background which is best encoded using a lossy transform encoder rather than a constant color lossless encoder to maximize compression efficiency and prevent the generation of image artifacts.

In some embodiments, other information related to a source image including alpha blending information, mouse movement, screensaver activity or image composition information obtained from a desktop manager (e.g. Microsoft Windows Desktop Window Manager (WDM)) provides decomposition or encoding hints. As one example, a pattern of alpha blending for a group of pixels is generally indicative that an image region is of an object type and should be encoded at text pixels. As another example, a moving mouse or copy( ) command provides hints for motion estimation circuitry. As another example, an active screen saver generally indicates that an image may be encoded at reduced quality to preserve network bandwidth. A desktop manager provides application level information to the encoder. For example a Computer Aided Design (CAD) application window generally demands high quality encoding whereas a video window generally tolerates reduced quality encoding without reduced user experience.

In an embodiment, encoding method selector 2914 sets encoding parameters for the filters and encoders shown by writing to control registers of the circuits across control bus 2920.

Figure 30:
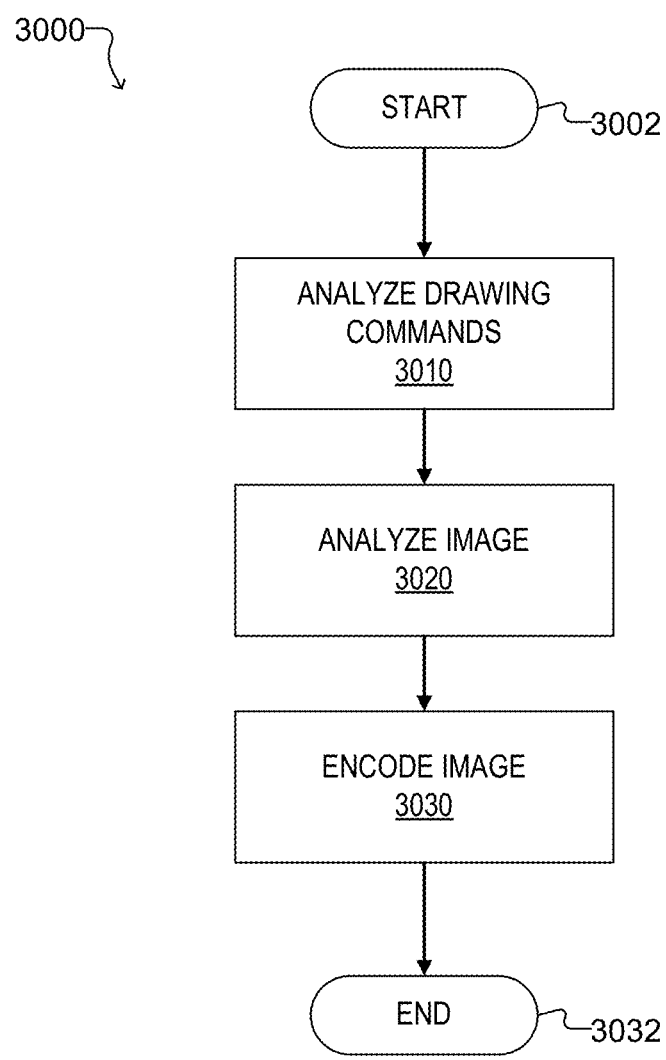
FIG. 30 is a flowchart that illustrates a method for encoding a computer image.

FIG. 30 is a flowchart of method 3000 for encoding a computer image, for example as executed by encoding system 2016 in conjunction with CPU 2006. Method 3000 starts at step 3002 ("Start") and proceeds to step 3010 ("Analyze drawing commands"). In an embodiment, at least one of "copy( )", "fill( )" or "BitBlt( )" commands executed by CPU 2006 are filtered by a command monitor (e.g., command monitor 2106) and analyzed to generate decomposition hints. In one embodiment, analyzing such drawing commands comprises identifying pixels identified by fill drawing commands as background pixels. In another embodiment, generating decomposition hints comprises identifying pixel boundaries of consistent pixel type as boundaries defined by BitBlt operations. In some such embodiments, the consistent pixel type comprises a section of picture pixels or a section of background pixels combined with a section of text pixels. In another embodiment, boundaries of consistent pixel type are identified by concatenating adjacent pixel boundaries defined by contiguous BitBlt operations to generate decomposition hints.

Method 3000 proceeds to step 3020 ("Analyze image") in which image decomposition circuit 2802 analyzes the image based on the decomposition hints to identify pixel types, such as picture pixels, background pixels and text pixels, suited for processing by different masked encoders. In various embodiments, step 3020 is conducted in conjunction with process 300 such that pixels not identified by drawing commands or decomposition hints are identified as picture pixels, background pixels or text pixels by application of a set of pixel filters in decomposition circuit 2802 (e.g., text detection filter 2900 and fill detection filter 2902). In an embodiment, the decomposition hints are weighted with results of the set of pixel filters to generate a final determination of whether pixels should be assigned to picture pixel, background pixel or text pixel layers.

Method 3000 proceeds to step 3030 ("Encode image"), in which the image is encoded based on identified pixel type. In an embodiment, multi-method encoder circuit 2804 comprises encoders 2904, 2910 and 2908 for encoding of text pixels, background pixels and picture pixels, respectively. The image mask which identifies positional information of the text pixels, background pixels and picture pixels is encoded by mask encoder 2906. Method 3000 ends at step 3032 ("End").

The tables below illustrate examples of drawing commands from various APIs that may be used by the display encoder to optimize image compression and transfer.

TABLE 1

Drawing Command Structures for Change Detect Optimization
CHANGE DETECT CIRCUIT

| Command Example | Application of Command in the Circuit | API Example |
|---|---|---|
| Draw. . . Fill. . . /Floodfill | Track absence of writing commands in area | GDI |
| Rect Viewport Raster Commands | Track absence of writing commands in area | OpenGL |

TABLE 2

Drawing Command Structures for Decomposition Optimization
DECOMPOSITION CIRCUIT

| Command Example | Application of Command in the Circuit | API Example |
|---|---|---|
| FillRectangle FillEllipse | Identifies area for possible background layer decomposition | GDI |
| Line Draw Commands | | OpenGL |
| DrawString | Indicates area for text layer decomposition | OpenGL |
| TextRendering-Hint | Indicates desired quality of text display | GDI+ |
| BitBlt/Bitmap decomposition | Indicates area for picture or object layer | GDI/ OpenGL |
| IVideoWindow | Indicates area for picture layer decomposition | DirectShow |

TABLE 3

Drawing Command Structures for Encoder Selector Optimization
ENCODER SELECTOR CIRCUIT

| Command Example | Application of Command in the Circuit | API Example |
|---|---|---|
| Quality and performance Hints | Influences selection of encoder method and parameters | OpenGL |
| IDMOQualityControl | Influences selection of encoder method and parameters | DirectX |
| IDMOVideoOutput-Optimizations | | DirectX |
| MPEG1VIDEOINFO | This structure describes an MPEG-1 video stream | DirectShow |
| MPEG2VIDEOINFO | This structure describes an MPEG-2 video stream | |
| VIDEOINFO | This structure describes the bitmap and color information for a video image | |

TABLE 4

Drawing Command Structures for Compression Method Selection
ENCODER SELECTOR CIRCUIT

| Command Example | Application of Command in the Circuit | API Example |
|---|---|---|
| Quality and performance Hints | Influences selection of encoder method and parameters | OpenGL |
| IDMOQualityControl | Influences selection of encoder method and parameters | DirectX |
| IDMOVideoOutput-Optimizations | | DirectX |
| MPEG1VIDEOINFO | This structure describes an MPEG-1 video stream | DirectShow |
| MPEG2VIDEOINFO | This structure describes an MPEG-2 video stream | |
| VIDEOINFO | This structure describes the bitmap and color information for a video image | |

TABLE 5

Drawing Command Structures for Predictive Encoding
PREDICTIVE ENCODER CIRCUIT

| Command Example | Application of Command in the Circuit | API Example |
|---|---|---|
| Viewport | Motion Search | OpenGL |
| Rotate;Translate; Scale | Motion Search | OpenGL |
| CopyPixel | Motion Search; Display Update | OpenGL |
| Quality and performance Hints | Compression Parameters | OpenGL |
| IDMOVideoOutput-Optimizations | Compression Parameters | DirectX |
| IAMVideoCompression | Sets and retrieves video compression properties | DirectShow |
| IAMVideoAccelerator | Enables a video decoder filter to access video accelerator functionality | |
| IAMVideoDecimationProperties | Enables an application to control where video decimation occurs | |
| IDecimateVideoImage | Interface specifies decimation on a decoder filter. The term decimation refers to scaling the video output down to a size smaller than the native size of the video | |

TABLE 6

Drawing Command Structures for Progressive Encoding
PROGRESSIVE ENCODER CIRCUIT

| Command Example | Application of Command in the Circuit | API Example |
|---|---|---|
| Lighting Enable | Build lighting features | OpenGL |
| Quality and performance Hints | Minimize progressive build in areas flagged as high quality | OpenGL |

TABLE 7

Drawing Command Structures for Lossless Encoding
LOSSLESS ENCODER CIRCUIT

| Command Example | Application of Command in the Circuit | API Example |
|---|---|---|
| Performance Hints | Influence compression ratio | OpenGL |

TABLE 8

Drawing Command Structures for Traffic Shaping
TRAFFIC SHAPER

| Command Example | Application of Command in the Circuit | API Example |
|---|---|---|
| Performance Hints | Influence traffic priority for encoded stream | OpenGL |
| IDMOVideoOutput-Optimizations IDMOQualityControl IVideoWindow | Influence traffic priority for encoded stream | DirectX |

TABLE 9

Drawing Command Structures for Power Management
POWER MANAGEMENT

| Command Example | Application of Command in the Circuit | API Example |
|---|---|---|
| Draw... Fill... / Floodfill | Track absence of writing commands in area | GDI |
| Rect Viewport | Track absence of writing commands in area | OpenGL |

TABLE 9-continued

Drawing Command Structures for Power Management
POWER MANAGEMENT

| Command Example | Application of Command in the Circuit | API Example |
|---|---|---|
| Raster Commands | | |

While the foregoing is directed to embodiments of the present invention, other and further embodiments of the invention may be devised without departing from the basic scope thereof, and the scope thereof is determined by the claims that follow.

The invention claimed is:

1. An apparatus for encoding an image, comprising:
    a decomposition circuit comprising a set of pixel filters, the decomposition circuit enabled to use the set of pixel filters to identify, within the image, (i) a set of background pixels compliant with background requirements of a constant color and defined spatial relationships, (ii) a set of text pixels compliant with text requirements of contrasting the constant color and defined proximity to pixels of the set of background pixels, and (iii) a set of picture pixels incompliant with the background requirements and the text requirements; and
    an image encoding circuit comprising:
        a lossy discrete transform encoder enabled to encode the set of picture pixels;
        a constant color lossless encoder enabled to encode a combination of the set of background pixels and the set of text pixels, as an encoding of a background image of the constant color; and
        a discrete color lossless encoder enabled to encode the set of text pixels as an overlay over the background image.

2. The apparatus of claim 1, wherein identifying the set of background pixels comprises:
    identifying a contiguous set of pixels with the constant color that exceeds a threshold number of pixels; and
    identifying additional pixels of the constant color, the additional pixels within a threshold distance from the contiguous set of pixels and separated from the contiguous set of pixels by a selection of the set of text pixels.

3. The apparatus of claim 1, wherein identifying the set of text pixels comprises:
    the set of pixel filters identifying a limited area of the set of text pixels as a result of the set of pixel filters detecting a threshold number of contrast detections for the limited area of the set of text pixels, each of the contrast detections exceeding a contrast threshold between adjacent pixels;
    the set of pixel filters identifying the limited area of the set of text pixels as being adjacent to a selection of the set of background pixels; and
    the set of pixel filters identifying a selection of the set of text pixels as pixels not included in the set of background pixels, the selection of the set of text pixels within a threshold distance of one pixel from the limited area of the set of text pixels.

4. The apparatus of claim 1, wherein the set of pixel filters identifies pixels of the image not identified as text pixels or background pixels as the set of picture pixels.

5. The apparatus of claim 1, wherein the lossy discrete transform encoder comprises one of a masked discrete wavelet transform encoder or a masked discrete cosine transform encoder.

6. The apparatus of claim 1, wherein the constant color lossless encoder comprises one of a run length encoder or a predictive encoder.

7. The apparatus of claim 1, wherein the discrete color lossless encoder comprises one of a masked color cache encoder or a masked dictionary encoder.

8. The apparatus of claim 1, wherein the constant color lossless encoder is further enabled to identify at least a portion of the set of text pixels as don't care pixels, and to encode a selection of the don't care pixels as background.

9. The apparatus of claim 1, wherein the image encoding circuit further comprises a pixel mask encoder enabled to encode positional information of the set of picture pixels, the set of background pixels, and the set of text pixels of the image.

* * * * *